US009751973B2

(12) United States Patent
Corley et al.

(10) Patent No.: US 9,751,973 B2
(45) Date of Patent: Sep. 5, 2017

(54) EPOXY SYSTEMS FOR COMPOSITES

(71) Applicants: Larry Steven Corley, Stafford, TX (US); Robert D. Farris, Stafford, TX (US); Carlton E. Ash, Stafford, TX (US)

(72) Inventors: Larry Steven Corley, Stafford, TX (US); Robert D. Farris, Stafford, TX (US); Carlton E. Ash, Stafford, TX (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 15/060,411

(22) Filed: Mar. 3, 2016

(65) Prior Publication Data
US 2016/0244552 A1 Aug. 25, 2016

Related U.S. Application Data

(63) Continuation of application No. 13/160,964, filed on Jun. 15, 2011.

(60) Provisional application No. 61/358,313, filed on Jun. 24, 2010.

(51) Int. Cl.
C08G 59/50 (2006.01)
C08G 65/48 (2006.01)
C08J 5/04 (2006.01)
C08L 63/00 (2006.01)
C08G 59/56 (2006.01)
F03D 1/06 (2006.01)

(52) U.S. Cl.
CPC ....... *C08G 59/5013* (2013.01); *C08G 59/504* (2013.01); *C08G 59/5006* (2013.01); *C08G 59/5033* (2013.01); *C08G 59/56* (2013.01); *C08J 5/043* (2013.01); *C08L 63/00* (2013.01); *F03D 1/0675* (2013.01); *C08J 2363/00* (2013.01); *Y02E 10/721* (2013.01); *Y02P 70/523* (2015.11)

(58) Field of Classification Search
None
See application file for complete search history.

(56) References Cited

U.S. PATENT DOCUMENTS

| 2,705,223 | A | * | 3/1955 | Renfrew | C08L 63/00 |
|---|---|---|---|---|---|
| | | | | | 52/309.1 |
| 3,008,909 | A | | 11/1961 | Ernst | |
| 3,164,375 | A | * | 1/1965 | Frenkel | A21C 1/065 |
| | | | | | 241/159 |
| 3,947,395 | A | | 3/1976 | Ogata et al. | |
| 4,051,195 | A | | 9/1977 | McWhorter | |
| 5,385,990 | A | | 1/1995 | Abbey et al. | |
| 5,688,905 | A | * | 11/1997 | Walker | C08G 59/50 |
| | | | | | 525/420 |
| 6,294,597 | B1 | | 9/2001 | Rinde et al. | |
| 6,319,967 | B1 | | 11/2001 | Coca et al. | |
| 6,485,788 | B1 | | 11/2002 | Coca et al. | |
| 6,489,396 | B2 | | 12/2002 | Nakamura et al. | |
| 6,649,734 | B2 | | 11/2003 | Campbell et al. | |
| 2003/0187155 | A1 | * | 10/2003 | Schile | C08G 59/18 |
| | | | | | 525/523 |
| 2006/0035088 | A1 | * | 2/2006 | Takano | C08G 59/18 |
| | | | | | 428/413 |
| 2010/0144965 | A1 | | 6/2010 | Marks et al. | |
| 2011/0319564 | A1 | | 12/2011 | Corley et al. | |

FOREIGN PATENT DOCUMENTS

| CA | 2261485 | 8/1999 | |
|---|---|---|---|
| CA | 2667427 | 5/2008 | |
| CA | 2730744 | 1/2010 | |
| EP | 0767189 B1 | 1/2004 | |
| GB | 1019925 | 2/1966 | |
| JP | 56002315 A | 1/1981 | |
| JP | 59232117 A | 12/1984 | |
| JP | 61145152 A | 7/1986 | |
| JP | 61148280 A | 7/1986 | |
| JP | 61162517 A | 7/1986 | |
| JP | 63-215716 | 9/1988 | |
| JP | 11060693 A | 3/1999 | |
| JP | 2005075915 A | 3/2005 | |
| RU | 2189997 C1 * | 9/2002 | |
| RU | 2252229 C2 | 5/2005 | |
| RU | 2375174 | 12/2009 | |
| WO | WO 95/24433 | 9/1995 | |
| WO | WO 2008072769 A1 * | 6/2008 | ........... C08G 59/504 |
| WO | WO 2008/140906 A1 | 11/2008 | |

OTHER PUBLICATIONS

Burton et al "Jeffamine® polyetheramines", Huntsman technical brochure, Published Apr. 27, 2005.*
English Machine Translation of RU218997, made Apr. 26, 2013.*
Lee, Henry, et al., Handbook of Epoxy Resins, (1967), pp. 7-1 to 7-33 and 9-1 to 9-15, McGraw-Hill, New York, United State.
Lee, Henry, et al., Handbook of Epoxy Resins, (1973), pp. 91, 101-103, 105, and 109, McGraw-Hill, Russia.
Bucknall, C. B., "Manufacture of Toughened Plastics", Toughened Plastics, 1977, pp. 1, V, and 83-87, Applied Scince Publishes LTD., London, Great Britian.
Peters et al., Annual Technical Conference—Society of Plastics Engineers, May 6-11, (2007), pp. 1-4, Society of Plastic Engineers, New York.

(Continued)

*Primary Examiner* — Christopher M Rodd

(57) ABSTRACT

Compositions and methods for forming epoxy resin systems are provided. In one embodiment, a composition is provided for an epoxy resin system including a reaction product of an epoxy resin component and a curing agent component comprising a first amine compound having the formula R1R2R3N, wherein R1 and R2 are independently an aliphatic or alicyclic organic functional group and R3 is an alkyl group, having a backbone of 2-18 carbon atoms, and a second amine compound having one or more primary or secondary amine groups, with the stoichiometric ratio of —NH bonds of the second amine compound to the epoxy groups of the epoxy resin component being from 1:20 to about 21:20. The composition may be used to form composites, such as used in commercial wind turbine blade manufacturing.

24 Claims, 7 Drawing Sheets

(56) References Cited

OTHER PUBLICATIONS

Unknown/Various, "Dicyandiamide" Epon Resin Structural Reference Manual, 1989, pp. 1-3, I-VIII, and 154-155, Shell Oil Company, Houston, United States.
Lee, Henry et al., Handbook of Epoxy Resins, (1967), pp. 7-10 to 7-13, McGraw-Hill New York, United States.
Burton et al. "Jeffamine(R) polyetheramies", Huntsman Technical Brochure, Published Apr. 27, 2005.
Griffin "WindPACT Turbine Design Scalling Studies Technical Area 1—Composite Blades for 80 to 120 Meter Rotor" NREL/SR-50029492 Subcontractor Report, Apr. 2001.

\* cited by examiner

EPOXY SYSTEMS FOR COMPOSITES

RELATED APPLICATION DATA

This application is a continuation application of co-pending U.S. patent application Ser. No. 13/160,964, filed Jun. 15, 2011, which application claims benefit to U.S. Provisional Application No. 61/358,313, filed Jun. 24, 2010, of which the entire contents of both applications are incorporated by reference herein.

FIELD OF THE INVENTION

The present invention relates to curing compositions for epoxy resin systems and to epoxy resins prepared utilizing the curing composition. The present invention also relates to methods of preparing epoxy resin systems and to articles made therefrom. The epoxy resin systems of the invention include a curing agent containing at least one tertiary amine.

BACKGROUND OF THE INVENTION

Epoxy resin systems are used in the manufacturing of various articles, including composites. Examples of articles that are being evaluated for manufacturing from epoxy resin systems include windmill blades. Fabricating windmill blades includes a number of requirements for effective manufacturing especially when a resin infusion manufacturing process is used. One need is for reduced exothermic heat release during the epoxy resin system cure of the article (composite) in thicker sections of the article since in such sections, the exothermic heat released during cure cannot be easily conducted away from the article. If excessive temperatures are reached during the cure process, thermal degradation of the cured resin in the "hot spots" can occur with resultant mechanical property loss in the fabricated article.

Additionally, during cure, the article may undergo thermal shrinkage. Thermal shrinkage of a cured epoxy resin causes stresses to build up in a composite during cooling down from the maximum temperature reached at or after gelation. The stresses sometimes lead to interlaminar cracking in the article, with resultant loss of mechanical properties. The higher the temperature reached during cure after the gel point, the greater the amount of stress that will accumulate in the article during cooling.

Standard epoxy systems used for fabricating windmill blades are cured with stoichiometric quantities of aliphatic amines, usually primary amines. The systems generally have high cure exothermic temperatures, with the center of a 100-gram mass of resin/curing agent mixture often reaching a peak temperature of 250° C. or higher when cured in a 70° C. water bath, which water bath simulates typical mold conditions for windmill blade cure. Such cured articles frequently have indentations with areas of apparent "collapse" of the part due to thermal (and/or chemical) shrinkage.

Epoxy systems cured with anhydrides often have lower cure exothermic heat release than those cured with primary amines. However, anhydride-cured systems typically require higher mold temperatures than systems cured with primary aliphatic amines in order to reach an acceptable degree of cure and level of cured properties. Many fabricators of windmill blades lack the ability to heat the molds to the temperatures required for a typical anhydride cure.

Resin systems used for large commercial windmill blade fabrication normally must reach a cured glass transition temperature (Tg) of at least 70° C. in a mold itself held at 70° C. A fast development of glass transition temperature is highly desirable since the fast development enables the part to be removed from the mold sooner and thereby reduces mold cycle time, enabling more parts to be fabricated in one mold in a given amount of time.

Other requirements include the absence of highly volatile components in the system (for vacuum infusion and thermal cure). Systems for infusion applications require an initial mixed viscosity low enough (and rate of viscosity increase at the infusion temperature low enough) to enable the reinforcing fiber preform to be completely infused with resin before the resin system becomes too viscous for satisfactory flow through the fibers and fabric of the substrate. The requirement for low initial viscosity and long pot life becomes more stringent as the size of the windmill blade increases and hence, the distance the liquid resin must travel during infusion.

Epoxy resin systems for windmill blade fabrication must generally also meet certain cured mechanical property requirements such as a minimum tensile strength of ~60 MPa, a minimum tensile modulus of ~2500 MPa, and a minimum tensile elongation of ~4%. Also, it is undesirable for the systems to contain components which are volatile enough that the system poses a combustibility hazard during normal fabrication conditions, or which are volatile enough that they tend to "boil" and form voids when the system is cured under vacuum.

In light of the above, there is a need in the art for curing agents for producing epoxy resin systems which have reduced exothermic heat release combined with desired cured mechanical properties when compared to the prior art resin compositions.

SUMMARY OF THE INVENTION

In one aspect, the invention is a composition including an epoxy resin system, which system includes a reaction product of an epoxy resin component and at least a tertiary amine curing agent.

In one embodiment, a composition for an epoxy resin system is provided, the epoxy resin system including a reaction product of an epoxy resin component and a curing agent component comprising a first amine compound represented by the formula:

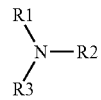

wherein R1 and R2 each comprise an organic functional group having from 1-6 carbon atoms, and R3 comprises an alkyl group, having a backbone of 2-18 carbon atoms and a second amine compound having one or more primary or secondary amine groups, wherein the stoichiometic ratio of the —NH bonds of the second amine compound to the epoxy groups of the epoxy resin component is from about 1:20 to about 21:20 and the molar ratio of the second amine compound to the first amine compound is from about 0.01:1 to about 100:1.

In another embodiment, a composite that is prepared using an epoxy resin composition is provided, the epoxy resin composition having been prepared using formulation components including an epoxy resin component and a curing agent component comprising a first amine compound represented by the formula:

wherein R1 and R2 each comprise an organic functional group having from 1-6 carbon atoms, and R3 comprises an alkyl group, having a backbone of 2-18 carbon atoms and a second amine compound having one or more primary or secondary amine groups, wherein the stoichiometic ratio of the —NH bonds of the second amine compound to the epoxy groups of the epoxy resin component is from about 1:20 to about 21:20 and molar ratio of the second amine compound to the first amine compound is from about 0.01:1 to about 100:1.

In another embodiment, a method is provided for preparing an epoxy resin composition, including providing an epoxy resin component to a mixing device, providing a curing agent component to the mixing device, and the curing agent component comprising a first amine compound represented by the formula:

wherein R1 and R2 each comprise an organic functional group having from 1-6 carbon atoms, and R3 comprises an alkyl group, having a backbone of 2-18 carbon atoms and a second amine compound having one or more primary or secondary amine groups, wherein the stoichiometic ratio of the —NH bonds of the second amine compound to the epoxy groups of the epoxy resin component is from about 1:20 to about 21:20 and molar ratio of the second amine compound to the first amine compound is from about 0.01:1 to about 100:1, and reacting the epoxy resin component and curing agent.

In another embodiment, a method is provided for manufacturing a composite, including providing a reinforcing fiber substrate, mixing an epoxy resin system from a composition comprising an epoxy resin component and a curing agent component comprising a first amine compound represented by the formula:

wherein R1 and R2 each comprise an organic functional group having from 1-6 carbon atoms, and R3 comprises an alkyl group, having a backbone of 2-18 carbon atoms, and a second amine compound having one or more primary or secondary amine groups, wherein the stoichiometic ratio of the —NH bonds of the second amine compound to the epoxy groups of the epoxy resin component is from about 1:20 to about 21:20 and molar ratio of the second amine compound to the first amine compound is from about 0.01:1 to about 100:1, contacting the reinforcing fiber substrate with the epoxy resin system, and curing the epoxy resin system to form the composite.

The second amine compound comprises one or more amine compounds selected from the group consisting of a polyether diamine, a saturated aliphatic ring diamine, a linear aliphatic amine, and combinations thereof. The stoichiometic ratio of the —NH bonds of the second amine compound to the epoxy groups of the epoxy resin component may be up to 1:1, such as from 1:20 to 1:1, for example, from 3:10 to 3:4. The polyether amine may have the formula: $H_2NCH(CH_3)CH_2[OCH_2CH(CH_3)]_xNH_2$, and x is from 2 to 70.

The R3 group may comprise a 3-12 carbon atom alkyl group, such as an 8-12 carbon atom alkyl group, selected from the group consisting of a linear alkyl group, a branched alkyl group, an unsaturated alkyl group, a cyclic group, an arylalkyl group, and combinations thereof. The R3 group may further comprise a functional group selected from the group consisting of a primary amine group, a secondary amine group, a tertiary amine group, and combinations thereof. The R3 group may comprise an alkyl group having a backbone of 2-18 carbon atoms and a functional group selected from the group consisting of an acrylate group, a methacrylate group, an acrylamide group, a methacrylamide group, and combinations thereof.

Each R1 and R2 may each comprise a functional group selected from the group consisting of a methyl group, an ethyl group, a propyl group, a C5-C6 carbocyclic aliphatic ring, a C5-C6 heterocyclic aliphatic ring, a C5-C6 saturated aliphatic ring, a C5-C6 unsaturated aliphatic ring, and combinations thereof. In one embodiment, R1 and R2 are both methyl functional groups. Additionally, both R1 and R2 may jointly form a ring.

The first amine compound may be one or more compounds selected from the group consisting of dimethylaminopropylmethacrylamide (DMAPMA), octyldimethylamine (ODMA), dodecyldimethylamine (DDMA), decyldimethylamine (DMA), dimethylaminoethoxyethanol (DMAEE), and combinations thereof. The first amine compound may comprise dodecyldimethylamine, and the second amine may comprise a mixture of isophoronediamine and the polyetheramine: $H_2NCH(CH_3)CH_2[OCH_2CH(CH_3)]_{2.5}NH_2$. The above first amine compound formula may also comprise a tertiary amine Mannich base.

A modified amine compound may also be used with the first amine compound described herein. The modified amine compound may include a compound selected from the group of a secondary amine Mannich base, a polyamide compound, an amine-epoxy adduct, and combinations thereof. The modified amine compound may be used as a co-curing agent for use with the tertiary amine first amine compounds as described herein. Alternatively, the modified amine compound may used in place of the first amine compound.

The epoxy resin component may further comprise a polyglycidyl ether of a compound selected from the group consisting of an aliphatic glycol, a cycloaliphatic glycol, a triol, a polyol, a polyglycol, and combinations thereof. The epoxy resin system may further comprise a polyacrylate or polymethacrylate ester of a polyol.

When cured, the reaction product of the epoxy resin component and the curing agent may exhibit a $T_g$ of 70° C. or greater at a cure time of less than 2 hours as measured by Differential Scanning Calorimetry. When curing, the reaction product of the epoxy resin component and the curing agent may exhibit a maximum exothermic temperature of 230° C. or lower for a 100 gram mass in a water bath at 70° C.

The composite formed from the epoxy resin component and the curing agent may exhibit a maximum exothermic temperature of 230° C. or lower during formation. The composite may further include a reinforcing fiber substrate. The composite may be in the form of a windmill blade. The composite may exhibit a transverse tensile strength of greater than 50 MPa with a strain of 0.5% or greater and transverse tensile modulus of greater than 11 GPa, a 0° flex strength of greater than 900 MPa with a 0° flex modulus of greater than 33 GPa, and an in-plane shear strength of greater than 60 MPa.

The reaction of the epoxy resin component and the curing agent may exhibit a maximum exothermic temperature of 230° C. or lower for a 100 gram mass in a water bath at 70° C.

The reinforced fiber substrate may be one or more layers of fiberglass material. The contacting the reinforcing fiber substrate with the epoxy resin system may comprise an application process selected from the group consisting of including hand lamination, an infusion process, filament winding, pultrusion, resin transfer molding, fiber pre-impregnation processes, and combinations thereof.

DESCRIPTION OF THE FIGURES

The following is a brief description of figures wherein like numbering indicates like elements.

DETAILED DESCRIPTION OF THE INVENTION

Figure 1:
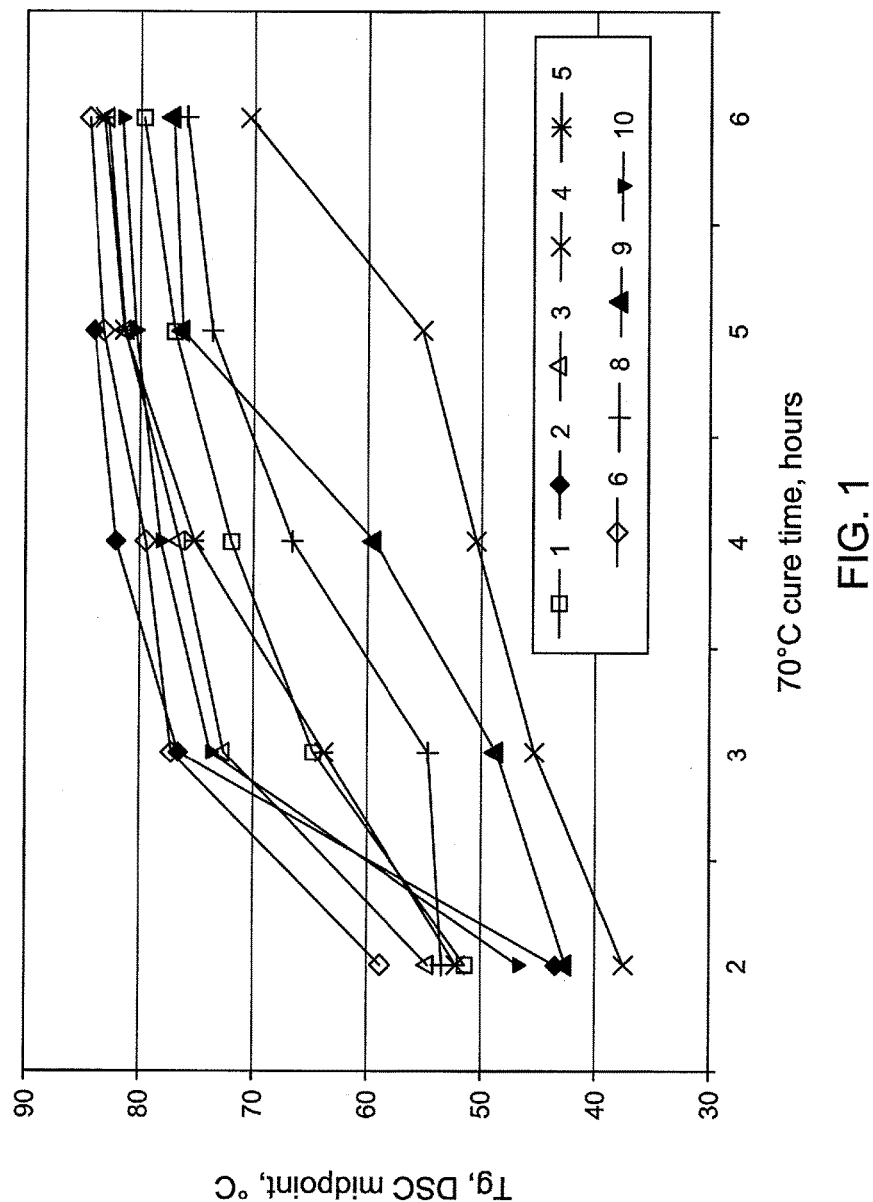
FIG. 1 is a plot illustrating one embodiment of a glass transition temperature ($T_g$) development rate versus cure time for invention systems and control and comparative systems (from Table 1) during cure at 70° C.

The epoxy resin system of the invention includes the reaction product of at least one epoxy resin component and a curing agent component containing at least a tertiary amine. The invention comprises the use of tertiary amines as curing agents for epoxy resins, especially in composites applications or ambient and heat cured coating applications. The tertiary amines can be used either alone or in combination with primary and/or secondary amines. The —NH bonds of the primary and/or secondary amines may be provided with stoichiometric ratios to epoxy groups of less than 1.

In comparison with prior art systems based on mixtures of epoxy resins with stoichiometric quantities of primary and/or secondary amines, the epoxy resin systems described herein have unexpectedly and surprisingly provided the advantages of lowered cure exothermic temperatures and heat generation with improved control on cure shrinkage, and in some cases, a more rapid cure rate under typical mold conditions (enabling reduced cycle times). Additionally, composite materials made from the epoxy resin systems have surprisingly and unexpectedly shown improved properties with regard to tensile stress, flex, and shear strength.

In one embodiment of the invention, a composition of an epoxy resin system is provided and includes a reaction product of an epoxy resin component and a curing agent component comprising at least a tertiary aliphatic amine represented by the formula:

(I)

and R1 and R2 groups may each be, independently, an organic functional group having from 1-6 carbon atoms. The organic functional group may be an aliphatic or an alicyclic organic functional group. Alternatively, R1 and R2 may comprise one common ring. The R3 group may be an alkyl group, having a backbone of 2-18 carbon atoms, such as from 4-12 carbon atoms, or in one example, from 8-18 carbon atoms.

Additionally the curing agent component may further include a second amine compound having one or more primary or secondary amine groups. The stoichiometric ratio of the —NH bonds of the second amine compound to the epoxy groups of the epoxy resin component may be from about 1:20 to about 21:20, such as from 1:10 to 19:20.

A. Epoxy Resin Component

The epoxy resin systems of the invention include at least one epoxy resin component. Epoxy resins are those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric. The epoxy resin component comprises from about 55 percent by weight (wt. %) to about 98 wt. %, such as about 70 wt. % to about 95 wt. % of the epoxy resin system.

Epoxy Resin

In one embodiment, the epoxy resin component may be prepared by reacting an epihalohydrin, such as epichlorohydrin, with a compound containing at least one, two or more, hydroxyl groups under basic conditions, such as in an alkaline reaction medium or in the presence of a suitable base.

Examples of such suitable epoxy resin components include, but are not limited to, polyglycidyl ethers of poly- or dihydric phenols, polyglycidyl ethers of glycols or polyglycols, epoxy novolacs, other glycidated polyphenolic resins, polyglycidyl esters of polycarboxylic acids, fusion reaction products between the epoxy resins and additional polyhydric phenolic compounds as those disclosed and described in U.S. Pat. Nos. 3,477,990 and 4,734,468, and combinations thereof.

Examples of suitable phenolic compounds used in preparing the epoxy resins include, but are not limited to resorcinol, catechol, t-butylcatechol, hydroquinone, bisphenol A (BPA), bisphenol E (BPE), bisphenol F (BPF), tris(4-hydroxyphenyl)methane, 1,1-bis(4-hydroxyphenyl)isobutane, 2,2-bis(4-hydroxyphenyl)butane, 2,2-bis(4-hydroxy-3-tert-butylphenyl)propane, 1,1-bis(4-hydroxyphenyl)cyclohexane, 2,6,2',6'-tetrachloro-p, p'-bisphenol A, 2,6,2',6'-tetrabromo-p,p'-bisphenol A, 2,6,2',6'-tetramethyl-3,5,3'-tribromo-p-p'-biphenol, 2,6,2',6'-tetramethyl-3,5,3',5'-tetrabromo-p,p'-biphenol, tetramethylbiphenol0, 1,5-dihydroxynaphthalene, bis(2-hydroxy-1-naphthyl)methane, bis(4-hydroxyphenyl) sulfone, bis(4-hydroxyphenyl) ether and the like and combinations thereof.

Examples of such epoxy resin components include, but are not limited to, EPON Resins 825, 826, 828, 862 and 1001 commercially available from Momentive Specialty Chemicals, Inc., of Columbus, Ohio.

In another embodiment, the epoxy resin may contain a monofunctional or multifunctional epoxy diluent as a viscosity reducer.

Epoxy Resin Modified with Monofunctional or Polyfunctional Epoxy Diluents

In another embodiment, the epoxy resin component optionally includes a diluent, such as monofunctional ethers or polyglycidyl ethers of aliphatic or cycloaliphatic glycols or triols or polyols, or polyglycols. The monofunctional epoxy diluents may also include monoglycidyl esters.

Examples of the glycols include, but are not limited to, 1,4-butanediol, 1,5-pentanediol, 1,6-hexanediol, neopentyl glycol, cyclohexanedimethanol, hydrogenated BPA, polyethylene glycol, polypropylene glycol, trimethylolethane, trimethylolpropane and combinations thereof. Similar to the di- and tri-polyhydric phenol based epoxy resins, the aliphatic glycidyl and polyglycidyl ethers are usually prepared by reacting epichlorohydrin with a selected aliphatic diol (or triol or polyol or polyglycol or mixtures) in the presence of a Lewis acid catalyst, followed by conversion of the reaction intermediate(s) with sodium hydroxide to the product(s).

Examples of polyglycidyl ethers of an aliphatic glycol include 1,6 hexanediol diglycidyl ether (HDDGE) and 1,4 butanediol diglycidyl ether (BDDGE). Commercially available examples of such epoxy resin diluent components include, but are not limited to, HELOXY Modifier 32 (a diglycidyl ether of a polypropylene oxide) glycol), HELOXY Modifier 68 (the diglycidyl ether of neopentyl glycol), HELOXY Modifier 67 (a diglycidyl ether of 1,4 butanediol), HELOXY HD (a diglycidyl ether of 1,6 hexanediol), and HELOXY Modifier 107 (the diglycidyl ether of 1,4-cyclohexanedimethanol) from Momentive Specialty Chemicals, Inc.

The optional polyglycidyl ethers of aliphatic or cycloaliphatic glycols or triols or polyols, or polyglycols are blended with the epoxy resin component in a weight ratio of from 0 to up to about 100 parts of ether, such as from 5 parts to 35 parts, for each 100 parts of epoxy resin component. In another embodiment, the polyglycidyl ethers of aliphatic or cycloaliphatic glycols or triols or polyols, or polyglycols are blended with the epoxy resin component in a weight ratio of about 5 to about 100 parts of ether for each 100 parts of epoxy resin component.

Monofunctional ethers may include monoglycidyl ethers of phenols or glycidyl ethers based on mono- or multivalent aliphatic or cycloaliphatic alcohols. Examples of such diluents are, for example, phenyl glycidyl ether, cresyl glycidyl ether, p-tert-butylphenyl glycidyl ether, butyl glycidyl ether, $C_{12}$-$C_{14}$ alcohol glycidyl ether, butanediol diglycidyl ether, hexanediol diglycidyl ether, cyclohexanedimethanol diglycidyl ether, glycidyl ethers based on polyethylene- or polypropylene glycols, and combinations thereof.

The monofunctional epoxy diluents may also include monoglycidyl esters. Suitable monoglycidyl esters include aliphatic monoglycidyl esters, such as glycidyl esters of monocarboxylic acids, for example a glycidyl ester of hexanoic acid or a glycidyl ester of neodecanoic acid.

Epoxy Resin Modified with a Polyacrylate or Polymethacrylate Ester of a Polyol

In another embodiment, the epoxy resin component optionally includes a polyacrylate or polymethacrylate ester of a polyol which contains more than one terminal acrylate or methacrylate group. The esters are the acrylic and methacrylic acid esters of aliphatic polyhydric alcohols such as, for example, the di- and polyacrylates and the di- and polymethacrylates of alkylene glycols, alkoxylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol, tripentaerythritol and the like, or mixtures of the with each other or with their partially esterified analogs. Alternatively, the epoxy resin component optionally includes a monoacrylate or monomethacrylate ester of an alcohol or polyol.

Examples of suitable acrylate or methacrylate esters of polyols include, and are not limited to, trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate, pentaerythritol tetraacrylate, 1,6-hexanediol diacrylate, 1,6-hexanediol dimethacrylate, dipentaerythritol tetraacrylate, dipentaerythritol pentaacrylate, and combinations thereof. Particularly preferred acrylate or methacrylate esters of polyols are 1,6-hexanediol diacrylate, trimethylolpropane triacrylate, pentaerythritol triacrylate, and pentaerythritol tetraacrylate.

Additional acrylate or methacrylate esters of polyols are the acrylate or methacrylate esters of epoxide resins, wherein epoxide resins as used herein are considered to be polyols. The epoxide resins useful in reacting with acrylic or methacylic acid are those epoxide resins described above. The procedures for preparing the acrylate and methacrylate esters of epoxide resins are described in U.S. Pat. No. 3,377,406 which is hereby incorporated by reference.

The optional acrylate or methacrylate esters of the polyols are blended with the epoxy resin component in a weight ratio of from 0 to up to about 100 parts of ester for each 100 parts of epoxy resin component. In another embodiment, the acrylate or methacrylate esters of the polyols are blended with the epoxy resin component in a weight ratio of about 5 to about 100 parts of ester for each 100 parts of epoxy resin component.

B. Curing Agent Component

The epoxy resin systems of the invention include a curing agent component containing at least one tertiary amine, and optionally, one or more amines having one or more primary amine groups, secondary amine groups, or both. The tertiary amine may be added directly as the curing agent component or may be formed in situ as the curing agent component of the epoxy resin system. The curing agent component comprises from about 5 percent by weight (wt. %) to about 30 wt. %, such as from about 10 wt. % to about 25 wt. % of the epoxy resin system.

Suitable tertiary amines for use in the curing agent may include one or more tertiary amines having the formula:

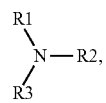
(I)

R1 and R2 groups may each be, independently, an organic functional group having from 1-6 carbon atoms, such as an aliphatic organic group, an alicyclic organic group, or combinations thereof. Examples of aliphatic groups include alkyl groups selected from the group of a methyl group, an ethyl group, and a propyl group. The alicyclic organic group may include, for example, a C5-C6 carbocyclic aliphatic ring, a C5-C6 heterocyclic aliphatic ring, a C5-C6 saturated aliphatic ring, or a C5-C6 unsaturated aliphatic ring. Alternatively, R1 and R2 may jointly comprise one common ring, and R3 may have one carbon atom, such as a methyl group when R1 and R2 jointly comprise one common ring.

The R3 group may be an alkyl group, having a backbone of 2-18 carbon atoms, such as a 3-12 carbon atoms, for example, an 8-12 carbon atom alkyl group. The R3 alkyl group may include a structure selected from the group consisting of a linear alkyl group, a branched alkyl group, an unsaturated alkyl group, a cyclic group, an alkyl group having an arylalkyl ring, and combinations thereof. Preferably, for a group containing an arylalkyl ring, the arylalkyl ring is not bonded to the tertiary nitrogen atom. Suitable R3 alkyl groups may further include a functional group selected from the group consisting of a hydroxyl group, a ketone group, an ester group, an ether group, an amide group, a thioether group, a sulfoxide group, sulfone linkages, and combinations thereof. The R3 alkyl group may further include a functional group selected from the group consisting of a primary amine group, a secondary amine group, a tertiary amine group, and combinations thereof.

Additionally, the R3 alkyl group may include a functional group selected from the group consisting of an acrylate group, a methacrylate group, an acrylamide group, a methacrylamide group, and combinations thereof. For example, $R_1$ and $R_2$ may be both methyl and $R_3$ contains an acrylate, methacrylate, acrylamide or methacrylamide group. Alternatively, for a R3 alkyl group further consisting of a methacrylamide group, the methacrylamide group may comprise from 7-18 non-hydrogen atoms, and including any additional hydrogen atoms as required to form the group, such as a methacrylamidopropyl group. An example of such a compound is dimethylaminopropylmethacrylamide, (DMAPMA).

Alternatively, the R3 group may comprise an aralkyl. The aralkyl group may have one or more carbon atoms disposed between the aryl ring structure and the nitrogen group. One example of the R3 group is a benzyl group, and one example of such a compound is benzyldimethylamine (BDMA).

Suitable tertiary amines may further contain between about 10 to about 50 non-hydrogen atoms, such as carbon atoms, nitrogen atoms, oxygen atoms, sulfur atoms, and combinations thereof.

One example of suitable tertiary amines may be alkyl dimethyl amines represented by the formula:

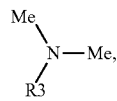
(II)

with Me representing a methyl group and the R3 group being an aliphatic linear alkyl group having a backbone of 8-12 carbon atoms as described herein.

Examples of suitable tertiary amines include, and are not limited to, dimethylaminopropylmethacrylamide (DMAPMA), octyldimethylamine (ODMA), dodecyldimethylamine (DDMA or ADMA-12), decyldimethylamine (DMA), dimethylaminoethoxyethanol (DMAEE), and combinations thereof.

In one embodiment of the curing agent component, the tertiary amine described above is the only curing agent component present in the epoxy resin system.

In another embodiment of the curing agent component, the first amine compound of the tertiary amine described above is used in combination with a second tertiary amine. One example of the second tertiary amine is 1,1,3,3-tetramethylguanidine (TMG). The combination of the first amine compound of the tertiary amine described above in combination with a second tertiary amine may be as the only curing agent component present in the epoxy resin system. Alternatively, the combination of the first amine compound of the tertiary amine described above in combination with a second tertiary amine may be used in conjunction with the second amine compound described herein.

In another embodiment of the curing agent component, the curing agent component includes a first amine compound of a tertiary amine having the formula described herein and a second amine compound having one or more active hydrogen atoms in a —NH bond, and the active hydrogen atoms may be bonded to the same nitrogen atom or to different nitrogen atoms. The second amine compound may include one or more amines selected from the group of a primary amine, a secondary amine, and combinations thereof. The primary amine may have one or more primary amine groups, such as a diamine with two primary amine groups; and the secondary amine may have at least one secondary amine group and one or more primary amine groups or secondary amine groups.

The second amine compound may include an amine compound selected from the group consisting of a polyether amine compound, a monoprimary amine, a linear diamine compound, a cyclic diamine compound, a triamine, a polyamine, and combinations thereof.

A suitable polyether amine may have the formula: $H_2NCH(CH_3)CH_2[OCH_2CH(CH_3)]_xNH_2$, where X is the number of repeating ether groups of the polyether amine backbone and X may be from 1 to 70 in number, for example, 2.5, 6.1, 33, or 68. Non-integer numbers of X represent the average value over a molecular weight distribution of a compound. Examples of commercial polyether amines are Jeffamine™ polyetheramines, such as Jeffamine™ D-230 available from Huntsman, Inc., of The Woodlands, Tex. Alternatively, the polyether amine described above may have one or more of the amine groups substituted with a hydrogen atom or an organic functional group, such as an ethyl group.

The monoprimary amine may have two carbons or more, and may be a cyclic monoprimary amine. Suitable monoprimary amines for use in the compositions described herein may include, and are not limited to, N-(3-aminopropyl)

morpholine, benzylamine, α-methylbenzylamine, phenethylamine, cyclohexylamine, benzhydrylamine, and combinations thereof.

A diamine may include a linear diamine compound or a cyclic diamine compound, such as isophoronediamine. Examples of diamines that may be used include isophoronediamine (IPDA), 1,3-bis(aminomethyl)benzene, 1,2-diaminocyclohexane, hexamethylenediamine, and combinations thereof.

The polyamine may be an aliphatic primary or secondary polyamine. Examples of such aliphatic primary or secondary polyamines include 1,6-hexanediamine, 1,2-ethanediamine, 2-methyl-1,3-pentanediamine, aminoethylethanolamine, diethylene triamine, triethylene tetramine, tetraethylenepentamine, and combinations thereof, among others.

The second amine, when utilized, may be present in an amount to provide a stoichiometric ratio of the —NH bonds of the second amine compound to the epoxy groups of the epoxy resin component of at least 1:100 or greater, such as 1:20 or greater, including from about 1:20 to about 21:20, such as from about 1:10 to about 19:20, including from about 3:10 to about 3:4, for example, from about 2:5 to 1:2.

The molar ratio of the second amine compound to the first amine compound, such as the aliphatic tertiary amine, in the curing agent may be from 0:1 (when no second amine compound is used) to about 10:1, such as from about 0.01:1 to about 100:1, such as from about 0.1 to about 8:1 or about 9:1, and for example, from about 1:1 to about 6:1. In one example, the molar ratio of second amine compound to the first amine compound is from about 2:1 to about 3:1.

Additionally, the equivalent ratio of —NH bonds to tertiary amine nitrogen atoms of the second amine compound to the first amine may comprise from 1 to 4 times the molar ratio. For example, a diamine with four —NH bonds as compared to a tertiary amine having a single tertiary amine nitrogen, such as dodecyldimethylamine, will have an equivalent ratio of 4 times the molar ratio.

Alternatively, the first amine compound may comprise from about 5 wt. % to about 95 wt. %, such as from about 20 wt. % to about 80 wt. % of the curing agent component when used in combination with the second amine compound to provide a total 100 wt. %. The first amine compound may comprise from about 1 wt. % to about 10 wt. %, such as from about 2 wt. % to about 8 wt. % of the epoxy system composition.

The second amine compound may comprise from less than about 95 percent by weight (wt. %), such as from about 5 wt. % to about 95 wt. %, based upon the weight of the curing agent component. The second amine compound may comprise from about 1 wt. % to about 35 wt. %, such as from about 5 wt. % to about 20 wt. % of the epoxy system composition.

In another embodiment, the epoxy resin system may include a reaction product of a monofunctional or multifunctional acrylate or methacrylate ester, a substoichiometric quantity of an amine containing two or more primary or secondary amine groups, and a tertiary aliphatic amine as described above. It is believed that one particular advantage of this type of system is that the acrylate ester acts as a viscosity reducer for the system, promoting infusion into a composite matrix while still providing a cured $T_g$ close to that of the system not containing a diluent.

In another embodiment, the curing agent may further include a modified amine compound. The modified amine compound may be used with the first amine compound described herein. The modified amine compound may include a compound selected from the group of a secondary amine Mannich base, an aminopolyamide compound, an amine-epoxy adduct, and combinations thereof. The modified amine compound may be used as a co-curing agent for use with the tertiary amine first amine compounds as described herein. Alternatively, the modified amine compound may used in place of the first amine compound.

A Mannich base is an aminoalkylphenol or aminoalkylcarbonyl compound formed by the reaction of an amine, an aldehyde, such as formaldehyde, and an enolate or phenolate anion. The Mannich base is a product of a nucleophilic addition of a non-enolizable aldehyde and any primary or secondary amine (Mannich reaction) to produce a resonance stabilized imine (iminium ion or imine salt) respectively having a secondary or tertiary amine group, which then reacts with the phenolate or enolate anion. Examples may include the condensates of phenol and formaldehyde or butyraldehyde with diethylenetriamine or triethylenetetramine.

The aminopolyamide is an amine-terminated oligomer of a dicarboxylic acid, such as a dimerized fatty acid, with a diamine or polyamine, such as diethylenetriamine or a triethylenetetramine. The aminopolyamide compound may be an aromatic polyamide compound, an aliphatic polyamide compound, or combinations thereof.

An amine-epoxy adduct is an adduct of an epoxy resin with one or more aliphatic amines. For example, the epoxyamine adduct may be the adduct of a diglycidyl ether of bisphenol A with a diamine or polyamine, such as ethylenediamine or di ethylene triamine.

C. Other Additives to the Epoxy Resin System

The composition may alternatively include additional compounds, such as an accelerator, toughening agent, fillers, a viscosity modifying agent, a release agent for molds, and combinations thereof.

In one embodiment of the composition, the composition may include an accelerator known to be compatible with amine-functional groups. Examples include sulfonates such as alkylbenzenesulfonates, phosphonates, sulfates, tetrafluoroborates, carboxylates and nitrates of Groups IA, IIA and transition metals of the Periodic Table (CAS version), preferably Mg, Ca, and Sn (II) salts and complexes. Other examples of accelerators include inorganic acids such as $HBF_4$, $H_2SO_4$, $H_2NSO_3H$, and $H_3PO_4$, carboxylic acids, particularly hydroxyl-group containing carboxylic acids such as salicylic acid, lactic acid, glycolic acid and resorcylic acid; phenolic compounds such as phenol, t-butylphenol, nonylphenol and BPA; imidazoles; cyanamide compounds such as dicyandiamide and cyanamide; sulfonamides such as p-toluenesulfonamide; and imides such as phthalimide, succinimide, maleimide, perylenetetracarboxylic diimide, and saccharin. In one embodiment, accelerators useful for the present invention include, but are not limited to calcium nitrate, calcium alkylbenzene sulfonates, magnesium alkanesulfonates, dicyandiamide, tetrafluoroboric acid, salicylic acid, phenol, dichloroacetic acid, trifluoroacetic acid, thiocyanic acid and mercaptoacetic acid. In another embodiment, the ammonium, calcium or magnesium salt of an acid may be used in place of the acids themselves.

The amount of optional accelerator will vary depending upon the particular curing agent used (due to cure chemistry and curing agent equivalent weight) and may be readily determined by one of ordinary skill in the art. In one embodiment, the accelerator is typically used in an amount of about 5 wt % or less, based upon the total weight of the curing agent.

The toughening agent may be core shell polymers, rubber, or thermoplastic materials, including any combination or subset thereof. Exemplary core shell polymers include, but are not limited to Kaneka Kane Ace® MX products which are core shell rubber dispersions in epoxy, cyanate ester, or other resins. In one embodiment, the core shell polymers include a styrene butadiene rubber, a polybutadiene rubber or a siloxane rubber. In another embodiment, the core of the core shell polymer includes a styrene butadiene rubber, a polybutadiene rubber or a siloxane rubber. Exemplary rubber materials include, but are not limited to carboxyl-terminated butadiene acrylonitrile rubber (CTBN), amine terminated butadiene acrylonitrile rubber (ATBN), butyl acrylate rubber and silicon rubber. Exemplary thermoplastic materials include, but are not limited to Arkema Nanostrength® MMA (methyl methacrylate) and SBM (styrene-butadiene-methacrylate) block copolymers, styrene-butadiene block copolymers, polysulfone, polyethersulfone, polyamide, polyurethane, and poly(butylene terephthalate). For example, a CTBN rubber may be used with an ATBN rubber, in some embodiments. Combinations of different types of toughening agents may also be used. For example, a core shell polymer may be used with a rubber material. Subsets of these combinations may also be used with the invention. Polycarbonate may also be used as a toughening agent.

Fillers may include nanomaterials, nanofibers, and combinations thereof. Exemplary nanomaterials include, but are not limited to nanoclays such as halloysite nanotubes (such as those provided by NaturalNano™) and single- and multi-walled carbon nanotubes (such as those provided by Zyvex® Performance Materials and Nanocyl® S.A.). In one embodiment, the nanomaterial is characterized as a structure having a size of from 1 to 100 nm in at least one dimension. Exemplary nanofibers include those such as the graphite nanofibers provided by Catalyx Nanotech™. In one embodiment, the nanofiber is characterized as a structure having a size of from 1 to 100 nm in at least one dimension. Filler material may also comprise mineral materials including clay, boehmite, calcium carbonates, aluminosilicates, silica, such as glass spheres, and combinations thereof. The toughening agents may be used in combinations.

D. Compositions

It has been surprising and unexpectedly found that the use of the first amine compound of a tertiary amine and the second amine compound including primary and/or secondary amines as a curing agent component in the epoxy resin systems with the described stoichiometric ratios of —NH bonds to epoxy groups provides for reduced exothermic heat generation and reduced processing temperature, controlled cure shrinkage, and a more rapid cure rate under typical mold conditions than conventional known epoxy resin systems.

In one embodiment, the maximum exothermic temperature of the cured composition is about 230° C. or less, such as from 170° C. to 230° C., as measured from the center of a resin mass. Prior art compositions have maximum exothermic temperatures of 260° C. or greater as shown below.

In one embodiment, the cure time at 70° C. needed to reach a glass transition temperature ($T_g$) of 70° C. was achieved at 3 hours or less, for example, at 2 hours or less. Prior art compositions required greater than 3 hours as shown below.

In one embodiment, there were no shrinkage indentations in the cured composition, thus, indicating controlled cure shrinkage in contrast to prior art compositions that have shrinkage indentations.

In one embodiment, the tensile elongation of the fully cured resin composition, as measured by ASTM D-638 at 25° C., is greater than 8%, such as from 8 to 15%.

In one embodiment, composites made with the invention compositions showed unexpectedly and surprisingly improved transverse tensile strength and transverse tensile strain properties with improved 0° flex strength and in-plane shear strength In order to provide a better understanding of the present invention including representative advantages thereof, the following examples are offered. It is understood that the examples are for illustrative purposes and should not be regarded as limiting the scope of the invention to any specific materials or conditions.

EXAMPLES

Epoxy resin systems described herein were formed by providing an epoxy resin component to a mixing device, providing a curing agent component to the mixing device, and reacting the epoxy resin component and curing agent.

The epoxy resin component and the curing agent component may be provided at an equivalent ratio of epoxy resin component (epoxy group) to curing agent component (N—H bond) from about 1:1 to about 100:1, such as from about 1.2:1 to about 10:1. The initial mixing temperature of the components may be from about 20° C. to about 80° C., such as from about 30° C. to about 70° C. The curing reaction was performed from about 0.08 hours to about 24 hours, such as from about 1 hour to about 6 hours. The mixing device may include a batch reaction vessel, a semi-batch reaction vessel, a mold, a continuous static mixer, or other suitable device known in the art.

Some embodiments of the mixing process are more detailed in the following examples.

The glass transition temperature ($T_g$) of the cured resins in the Examples was measured by Differential Scanning Calorimetry (DSC) at a heat-up rate of 20° C./minute from 50° C. to 220° C. followed by rapid cooling and a second identical heating rate scan. The midpoint of the curve in which heat capacity ($C_p$) increases from the glass plateau to the rubbery plateau was taken as the $T_g$. The DSC instrument utilized was a TA Instruments DSC Model Q20 and its temperature was calibrated using an indium and a tin standard.

The tensile strength, tensile modulus, and the tensile elongation of the cured resins in the Examples were measured by ASTM D-638. The tensile strength was determined as the maximum value in the stress-strain curve.

The maximum peak exothermic temperatures were measured by the following testing procedure on 100 gram mass in a water bath. The epoxy resin component and the curing agent component were preheated to 30° C. or 70° C. and were mixed. The mixture (100 g) was poured into a paper cup with a height of about 3.5 inches (8.9 cm), a bottom diameter of 2 inches (5.1 cm) and a top diameter of 3 inches (7.6 cm). The paper cup was trimmed to slightly over the level of the contained liquid and placed into a polypropylene beaker slightly larger in diameter than the cup. The beaker was immersed in a heating bath at the test temperature of 30° C. or 70° C. such that the bath liquid level outside the beaker was higher than the level of mixture in the cup. A thermocouple was placed inside the mixture with the tip of the thermocouple in the center of the mixture. The temperature was determined through the exothermic peak as a function of time until the exothermic energy essentially dissipated.

Example 1: Cure of EPON Resin 828 with One Curing Agent Component Described Herein A blend containing 80% by weight of EPON Resin 828 and 20% by weight of 1,6-hexanediol diglycidyl ether (HDDGE) was hand-mixed in small polypropylene beakers with different amounts of two primary amines (isophoronediamine (IPDA)) and Jeffamine D-230) and one tertiary amine (dodecyldimethylamine, DDMA) as indicated in Table 1 below. Small amounts of each blend were placed into several sealed aluminum sample pans for differential scanning calorimetry (DSC). Both the material in the beakers and the material in the sample pans were cured in an oven at 70° C. A DSC pan of each formulation was removed from the oven at one-hour cure time intervals from 2 to 6 hours. At the end of each cure period, the glass transition temperature ($T_g$) of the samples in the DSC pans was determined by running a DSC scan from room temperature to 200° C. The midpoint of the steep portion of the scan was taken as the $T_g$. The cured samples were removed from the polypropylene beakers after 6 hours of cure at 70° C. and evaluated visually. Results are shown in Table 1 below. The rate of increase in Tg with cure time at 70° C. is shown in FIG. 1 for various formulations from Table 1.

Figure 2:
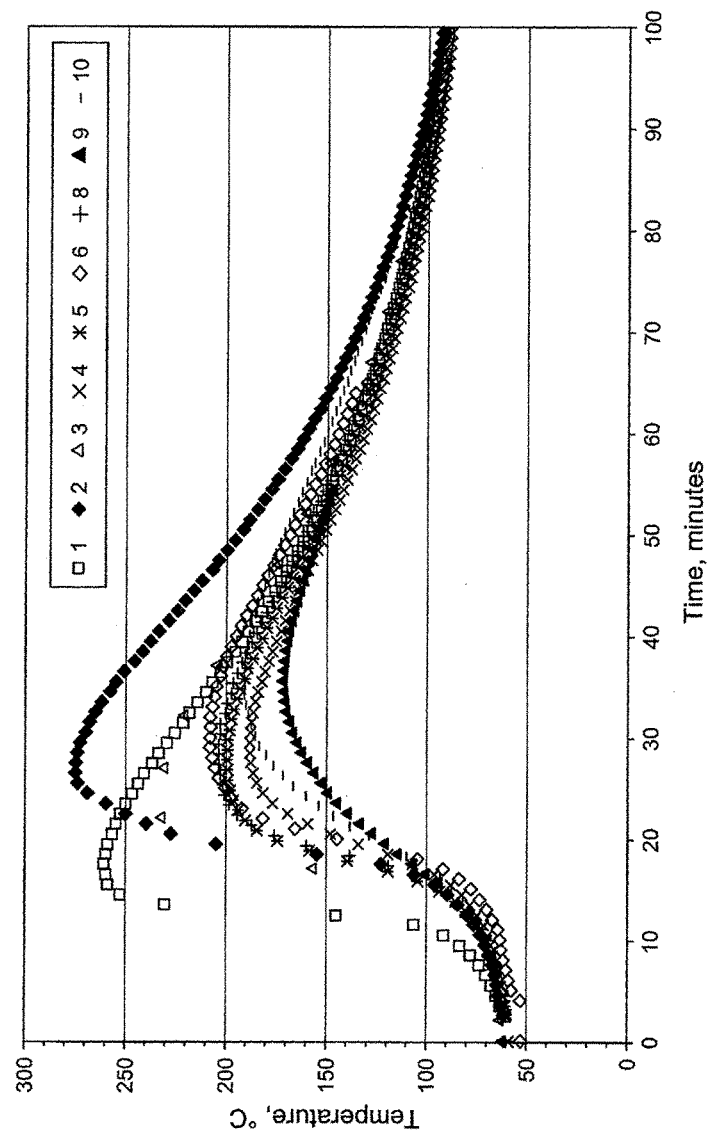
FIG. 2 is a plot illustrating one embodiment of an exothermic temperature versus time for invention systems and control and comparative systems (from Table 1) during cure at 70° C.

A separate experiment was conducted to simulate the temperatures which can develop in curing of thick sections of the resin mixtures due to heat buildup from the cure exothermic process. The formulations in Table 1 below were prepared at a 100-gram mass in a polypropylene beaker. The tip of a thermocouple was placed into the beaker and positioned at the center of the liquid resin mixture. The beaker was placed into a 70° C. water bath and the temperature at the center of the resin mass was monitored as a function of time. The respective maximum temperatures reached and the times to reach respective maximum temperatures for the samples are shown in Table 1. Curves of temperature versus time for various formulations from Table 1 are shown in FIG. 2.

TABLE 1

Cure of a diluted EPON Resin 828 with Various Primary and Tertiary Amines

| | Mixture# | | | | | | | | | |
|---|---|---|---|---|---|---|---|---|---|---|
| | 1 (control) | 2 | 3 | 4 | 5 | 6 | 7 | 8 | 9 | 10 |
| EPON Resin 828, g | 6.16 | 6.16 | 6.16 | 6.16 | 6.16 | 6.16 | 6.16 | 6.16 | 6.16 | 6.16 |
| HDDGE, g (diluent) | 1.54 | 1.54 | 1.54 | 1.54 | 1.54 | 1.54 | 1.54 | 1.54 | 1.54 | 1.54 |
| IPDA, g | 0.92 | 0.62 | 0.62 | 0.31 | 0.31 | 0.31 | 0.64 | 0 | 0 | 0 |
| Jeffamine D-230, g | 1.39 | 0.92 | 0.92 | 0.46 | 0.46 | 0.46 | 0 | 0.90 | 0 | 0 |
| NH/epoxy ratio | 1.0 | 0.68 | 0.68 | 0.34 | 0.34 | 0.34 | 0.34 | 0.34 | 0 | 0 |
| Tetramethylguanidine (TMG), g | 0 | 0.27 | 0 | 0 | 0 | 0 | 0 | 0 | 0 | 0 |
| DDMA, g | 0 | 0 | 0.27 | 0.27 | 0.40 | 0.54 | 0.54 | 0.54 | 0.54 | 0.81 |
| Did PP beaker melt? | Yes | N/A | N/A | No | No | No | No | No | No | No |
| Shrinkage indentations in cured sample? | Yes | N/A | N/A | No | No | No | No | No | No | No |
| Tg, ° C., after cure time at 70° C.: | | | | | | | | | | |
| 2 hours | 51 | 43 | 55 | 38 | 52 | 59 | N/A | 54 | 43 | 47 |
| 3 hours | 65 | 77 | 73 | 45 | 64 | 77 | N/A | 55 | 49 | 74 |
| 4 hours | 72 | 82 | 77 | 51 | 75 | 80 | N/A | 67 | 60 | 78 |
| 5 hours | 77 | 84 | 81 | 55 | 81 | 83 | N/A | 74 | 77 | 80 |
| 6 hours | 80 | N/A | 83 | 70 | 83 | 85 | N/A | 76 | 78 | 82 |
| 6 hours (repeat cure) | 77 | N/A | 86 | 75 | 81 | 89 | 91 | 76 | 79 | 83 |
| Cure on 100 gram mass in 70° C. water bath: | | | | | | | | | | |
| Max peak exotherm temp at center, ° C. | 261 | 275 | 233 | 188 | 200 | 208 | N/A | 204 | 172 | 191 |
| Time to max peak temperature, min | 18 | 25 | 22 | 29 | 28 | 29 | N/A | 27 | 36 | 35 |
| Tensile properties: | | | | | | | | | | |
| Yield strength, MPa | 66.2 | N/A | 64.3 | 56.5 | 63.4 | 61.3 | N/A | 58.4 | 55.5 | N/A |
| Modulus, MPa | 2953 | N/A | 2663 | 2629 | 2677 | 2551 | N/A | 2517 | 2423 | N/A |
| Elongation at break, % | 9.7 | N/A | 10.7 | 14.2 | 10.5 | 10.7 | N/A | 8.6 | 10.9 | N/A |

In the wind energy industry it is generally accepted that a part can normally be removed from a mold (enabling the mold to be used for the next part) when its Tg reaches 70° C. FIG. 1 illustrates a comparison of $T_g$ development rate of invention systems and control (from Table 1) during cure at 70° C.

As shown in FIG. 1, several of the compositions had a faster rate of development of glass transition temperature ($T_g$) at the 70° C. cure temperature than the first control system (#1). The first control composition (#1) required almost 4 hours at a 70° C. cure temperature to reach a 70° C. $T_g$. Three of the invention compositions (#6, #3 and #10) reached this $T_g$ value in 3 hours or less (as measured by Differential Scanning Calorimetry) despite much lower maximum cure exotherm temperatures of 208, 233 and 191° C. respectively (in comparison with 261° C. for control system #1). It is also true that a comparative system #2 using tetramethylguanidine (not part of the invention) likewise reached a $T_g$ of 70° C. in 3 hours or less under the cure conditions. However, this system showed in FIG. 2 a very high maximum cure exotherm temperature of 275° C., even higher than the value for control system #1.

FIG. 2 illustrates temperature versus time at center of a 100-gram mass of resin during cure in a 70° C. water bath for invention and control and comparative systems from Table 1. As shown in FIG. 2, several of the compositions had a much lower maximum exothermic peak in a 100-gram mass in a 70° C. water bath (FIG. 2). The control system #1 had a maximum exothermic peak temperature of 261° C. whereas the maximum exothermic peak temperature for most of the systems incorporating the tertiary amines described herein was 210° C. or lower as shown in Table 1.

Additionally, from Table 1, the systems that were cured with a tertiary amine (dodecyldimethylamine) or a mixture of dodecyldimethylamine with a substoichiometric amount of one or two primary amines (isophoronediamine and a polyether amine, Jeffamine D-230) did not show shrinkage indentations when cured at 70° C. for 6 hours in the polypropylene beakers. The systems also did not melt the beakers during cure. In contrast, the prior art system (system #1) showed profound shrinkage indentations and deformation at the end of cure and also melted the beaker during cure.

Example 2: Cure of EPON Resin 828 with Different Curing Agents

A blend containing 100 parts of a composition of 80% EPON Resin 828 and 20% by weight of 1,6-hexanediol diglycidyl ether (HDDGE) was hand-mixed in small polypropylene beakers with 10 to 30 parts of two primary diamines (isophoronediamine (IPDA)) and a polyether-amine, Jeffamine D-230) and one tertiary amine (dodecyldimethylamine, DDMA, decyldimethylamine, DMA, or dimethylaminoethoxyethanol, DMAEE) or tetramethylguanidine (TMG) as indicated in Table 2 below.

Figure 3:
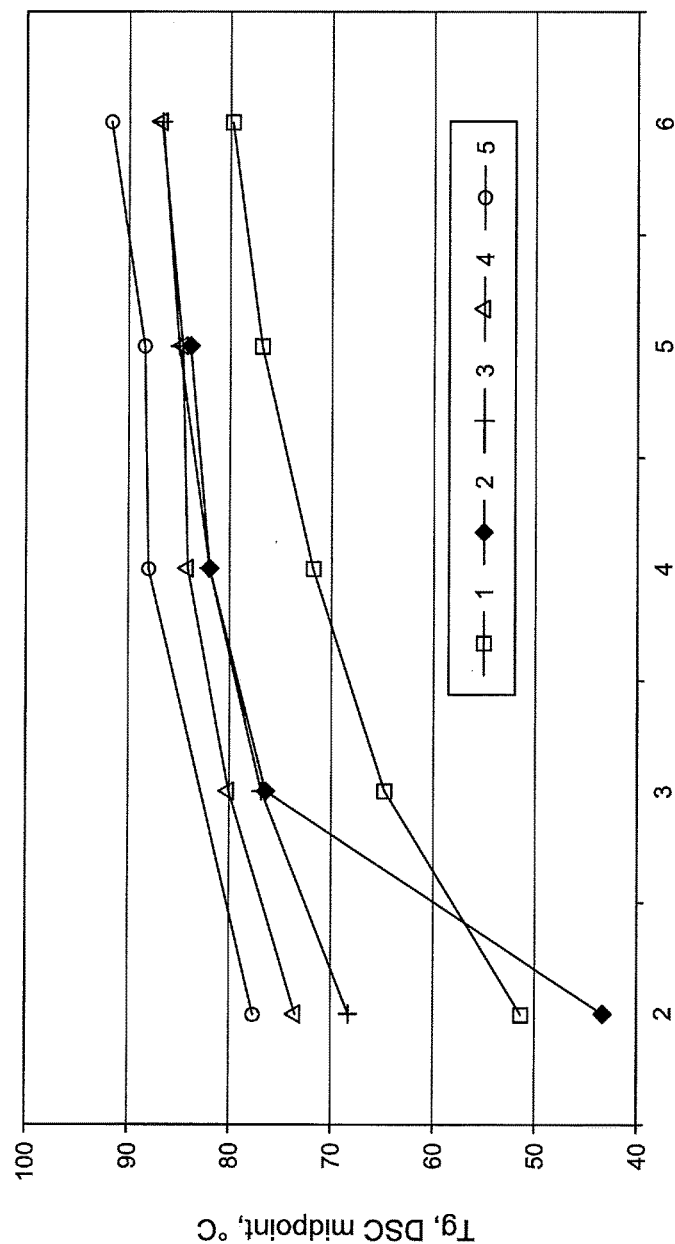
FIG. 3 is a plot illustrating one embodiment of a glass transition temperature ($T_g$) development rate versus cure time for invention systems and control and comparative systems (from Table 2) during cure at 70° C.

The samples were placed into DSC pans as in Example 1 above and were cured at 70° C. for different amounts of time. The results are shown in Table 2 below. The rate of increase in $T_g$ with cure time at 70° C. is shown in FIG. 3 for various formulations from Table 2.

Figure 4:
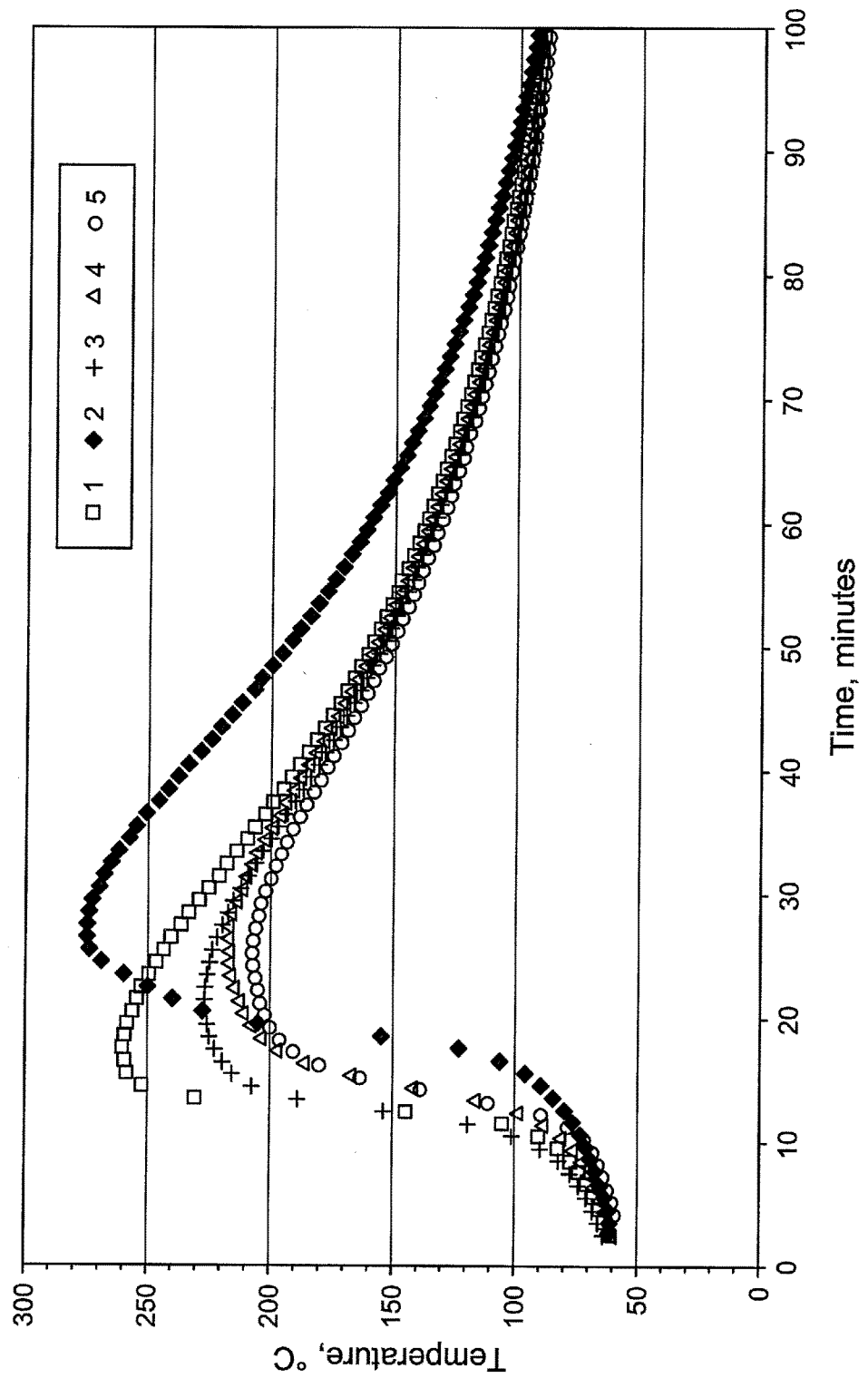
FIG. 4 is a plot illustrating one embodiment of an exothermic temperature versus time for invention systems and control and comparative systems (from Table 2) during cure at 70° C.

A separate experiment was conducted to simulate the temperatures which can develop in curing of thick sections of the resin mixtures due to heat buildup from the cure exotherm. The formulations in Table 2 below were prepared at a 100-gram mass in a polypropylene beaker. The tip of a thermocouple was placed into the beaker and positioned at the center of the liquid resin mixture. The beaker was placed into a 70° C. water bath and the temperature at the center of the resin mass was monitored as a function of time. The respective maximum temperature reached and the times to reach such temperatures for the samples are shown in Table 2. Curves of temperature versus time for various formulations from Table 2 are shown in FIG. 4.

TABLE 2

Cure of a diluted EPON Resin 828 with Various Primary and Tertiary Amines

| Mixture# | 1 (control) | 2 | 3 | 4 | 5 |
|---|---|---|---|---|---|
| EPON Resin 828 and HDDGE (diluent), parts | 100 | 100 | 100 | 100 | 100 |
| Jeffamine D-230, parts | 18 | 12 | 9 | 6 | 6 |
| IPDA, parts | 12 | 8 | 6 | 4 | 4 |
| Tetramethylguanidine (TMG), parts | 0 | 3.5 | 0 | 0 | 0 |
| DDMA, parts | 0 | 0 | 6 | 0 | 0 |
| DMA, parts | 0 | 0 | 0 | 6 | 0 |
| DMAEE, parts | 0 | 0 | 0 | 0 | 3.4 |
| Tg, ° C., after cure time at 70° C.: | | | | | |
| 2 hours | 51 | 43 | 68 | 74 | 78 |
| 3 hours | 65 | 77 | 78 | 80 | N/A |
| 4 hours | 72 | 82 | 82 | 84 | 88 |
| 5 hours | 77 | 84 | 86 | 85 | 88 |
| 6 hours | 80 | N/A | 87 | 87 | 92 |
| 6 hours (repeat cure) | 77 | 87 | 87 | 87 | 89 |
| Tg, ° C., after 6 hours at 70° C. cure and after 30 min at 200° C.: | 88.5 | 85.2 | 80.7 | 82.4 | 94 |
| Max peak exotherm temp at center, ° C.* | 261 | 275 | 228 | 218 | 208 |
| Time to max peak temperature, min | 18 | 27 | 22 | 26 | 24 |
| Viscosity, Brookfield, 25° C., mPa-s (cps) | 311 | 279 | 276 | 342 | N/A |
| Tensile properties: | | | | | |
| Yield strength, MPa | 66.2 | 69.8 | 62.9 | 60.9 | N/A |
| Break strength, MPa | N/A | N/A | 54.7 | 43.3 | N/A |
| Modulus, MPa | 2953 | 2961 | 2718 | 3342 | N/A |
| Yield strain, % | 4.5 | 5.0 | 5.0 | 3.3 | N/A |
| Break strain, % | 9.7 | 9.8 | 9.4 | 10.9 | N/A |

*Cure on 100 gram mass in 70° C. water bath.

FIG. 3 illustrates a comparison of $T_g$ development rate of invention systems and control and comparative systems (from Table 2) during cure at 70° C. As shown in FIG. 4, several of the compositions had a faster rate of development of glass transition temperature ($T_g$) at the 70° C. cure temperature than the first control system (#1). The first control composition (#1) required almost 4 hours at a 70° C. cure temperature to reach a 70° C. $T_g$. Systems #3, #4, and #5, using the respective tertiary amines described herein reached the $T_g$ value in less than 2.5 hours (as measured by Differential Scanning Calorimetry) despite much lower maximum cure exotherm temperatures of 228° C., 218° C., and 208° C. respectively (in comparison with 261° C. for control system #1 and 275° C. for comparative system #2). It is also true that comparative system #2 using tetramethylguanidine (not part of the invention) likewise reached a $T_g$ of 70° C. in 3 hours or less under the cure conditions. However, this system showed in FIG. 3 a very high maximum cure exotherm temperature of 275° C., even higher than the value for control system #1.

FIG. 4 illustrates temperature versus time at center of a 100-gram mass of resin during cure in a 70° C. water bath for invention and control and comparative systems from Table 2. As shown in FIG. 4, Systems #3, #4, and #5, using the respective tertiary amines described herein have a much lower maximum exothermic peak (228° C., 218° C., and 208° C. respectively) in a 100-gram mass in a 70° C. water bath (FIG. 4). The control system #1 had a maximum exothermic peak temperature of 261° C. and comparative system #2 had a maximum exothermic peak temperature of 275° C.

Additionally, from Table 2, systems #3, #4, and #5 in Table 2 did not show shrinkage indentations when cured at 70° C. for 6 hours in the polypropylene beakers. The systems also did not melt the beakers during cure. In contrast, the prior art system (system #1) showed profound shrinkage indentations and deformation at the end of cure and also melted the beaker during cure.

Example 3: Effect of Aliphatic Tertiary Amines Versus Other "Catalytic" Curing Agents (Tetramethylguanidine and an Imidazole) on Exotherm, Rate of $T_g$ Development and Other Properties of a Curing Epoxy Resin A blend containing 100 parts of a composition of 80% EPON Resin 828 and 20% by weight of 1,6-hexanediol diglycidyl ether (HDDGE) was hand-mixed in small polypropylene beakers with 4 parts of isophoronediamine (IPDA), 6 parts of a polyetheramine (Jeffamine D-230), and various amounts of different tertiary amines (dodecyldimethylamine, DDMA, decyldimethylamine, DMA, or dimethylaminoethoxyethanol, DMAEE) or other "catalytic" curing agents such as tetramethylguanidine (TMG) and 1-benzyl-2-methylimidazole (1-Bz-2-MI) as indicated in Tables 3A and 3B below. A control mixture contained 18 parts of Jeffamine D-230 and 12 parts of IPDA (stoichiometric N—H/epoxy ratio)

The samples were placed into DSC pans as in Example 1 above and were cured at 70° C. for different amounts of time. The results are shown in Tables 3A and 3B below.

A separate experiment was conducted to simulate the temperatures which can develop in curing of thick sections of the resin mixtures due to heat buildup from the cure exotherm. The formulations in Tables 3A and 3B below were prepared at a 100-gram mass in a polypropylene beaker. The tip of a thermocouple was placed into the beaker and positioned at the center of the liquid resin mixture. The beaker was placed into a 70° C. water bath and the temperature at the center of the resin mass was monitored as a function of time. The respective maximum temperature reached and the times to reach such temperatures for the samples are shown in Tables 3A and 3B.

TABLE 3A

Cure of Diluted EPON Resin 828 with Mixtures of Primary Amines with Tertiary Amines or Other "Catalytic" Curing Agents, Samples 1-8

| | Mixture# | | | | | | | |
|---|---|---|---|---|---|---|---|---|
| | Control 1 | 2 | 3 | 4 | 5 | 6 | 7 | 8 |
| 80% EPON Resin 828/ 20% HDDGE (diluent) mixture, parts | 100 | 100 | 100 | 100 | 100 | 100 | 100 | 100 |
| Jeffamine D-230, parts | 18 | 6 | 6 | 6 | 6 | 6 | 6 | 6 |
| IPDA, parts | 12 | 4 | 4 | 4 | 4 | 4 | 4 | 4 |
| N—H/epoxy ratio | 1.00 | 0.33 | 0.33 | 0.33 | 0.33 | 0.33 | 0.33 | 0.33 |
| DDMA, parts | 0 | 3.5 | 5.2 | 7.0 | 0 | 0 | 0 | 0 |
| DMA, parts | 0 | 0 | 0 | 0 | 4.5 | 6.1 | 9.1 | 0 |
| DMAEE, parts | 0 | 0 | 0 | 0 | 0 | 0 | 0 | 3.4 |
| TMG, parts | 0 | 0 | 0 | 0 | 0 | 0 | 0 | 0 |
| 1-Bz-2-MI, parts | 0 | 0 | 0 | 0 | 0 | 0 | 0 | 0 |
| $T_g$, ° C., after cure time Fat 70° C.: | | | | | | | | |
| 2 hours | 51 | 38 | 52 | 59 | 54 | 74 | N/A | 78 |
| 3 hours | 65 | 45 | 64 | 77 | 73 | 80 | N/A | N/A |
| 4 hours | 72 | 51 | 75 | 80 | 82 | 84 | N/A | 88 |
| 5 hours | 77 | 55 | 81 | 83 | 85 | 85 | N/A | 88 |
| 6 hours | 80 | 70 | 83 | 85 | 85 | 87 | N/A | 92 |
| 6 hours (repeat cure) | 77 | 75 | 81 | 89 | 86 | 87 | 82 | 89 |
| Tg, ° C., after 6 hours at 70° C. cure and after 30 min at 200° C.: | 88.5 | 80 | 82 | 79 | 86 | 82 | 71 | 94 |
| Max peak exotherm temp at center, ° C.* | 261 | 188 | 200 | 208 | 208 | 218 | N/A | 208 |
| Time to max peak temperature, min* | 18 | 29 | 28 | 29 | 23 | 24 | N/A | 24 |
| Viscosity, Brookfield, 30° C., mPa-s (cp) | 203 | 312 | 269 | 240 | N/A | N/A | N/A | 362 |
| Yield strength, MPa | 66.2 | 56.5 | 63.4 | 61.3 | N/A | 60.9 | N/A | N/A |
| Break strength, MPa | N/A | 47.2 | 57 | 54.4 | N/A | 43.3 | N/A | N/A |
| Modulus, MPa | 2953 | 2629 | 2677 | 2551 | N/A | 3342 | N/A | N/A |
| Yield strain, % | 4.5 | 4.4 | 5.4 | 5.6 | N/A | 3.3 | N/A | N/A |
| Break strain, % | 9.7 | 14.2 | 10.5 | 10.7 | N/A | 10.9 | N/A | N/A |

*Cure on 100 gram mass in 70° C. water bath.

Table 3B

Cure of Diluted EPON Resin 828 with Mixtures of Primary Amines with Tertiary Amines or Other "Catalytic" Curing Agents, Samples 1, and 9-12

| Mixture# | Control 1 | 9 | 10 | 11 | 12 |
|---|---|---|---|---|---|
| 80% EPON Resin 828/20% HDDGE (diluent) mixture, parts | 100 | 100 | 100 | 100 | 100 |
| Jeffamine D-230, parts | 18 | 6 | 6 | 6 | 6 |
| IPDA, parts | 12 | 4 | 4 | 4 | 4 |
| N-H/epoxy ratio | 1.00 | 0.33 | 0.33 | 0.33 | 0.33 |
| DDMA, parts | 0 | 0 | 0 | 0 | 0 |
| DMA, parts | 0 | 0 | 0 | 0 | 0 |
| DMAEE, parts | 0 | 0 | 0 | 0 | 0 |
| TMG, parts | 0 | 2.6 | 5.2 | 0 | 0 |
| 1-Bz-2-MI, parts | 0 | 0 | 0 | 4.2 | 8.3 |
| $T_g$, ° C., after cure time at 70° C.: | | | | | |
| 2 hours | 51 | 41 | 51 | 51 | 56 |
| 3 hours | 65 | 55 | 81 | 55 | 86 |
| 4 hours | 72 | 71 | 83 | 79 | 91 |
| 5 hours | 77 | 85 | 86 | 81 | 90 |
| 6 hours | 80 | | 95 | 85 | 96 |
| 6 hours (repeat cure) | 77 | 82 | 90 | 88 | 97 |
| Tg, ° C., after 6 hours at 70° C. cure and after 30 min at 200° C.: | 88.5 | 92 | 81 | 113 | 105 |
| Max peak exotherm temp at center, ° C.* | 261 | 240 | 299 | 266 | 307 |
| Time to max peak temperature, min* | 18 | 38 | 38 | 28 | 24 |
| Viscosity, Brookfield, 30° C., mPa-s (cp) | 203 | N/A | N/A | 399 | 360 |
| Yield strength, MPa | 66.2 | N/A | N/A | N/A | N/A |
| Break strength, MPa | N/A | N/A | N/A | N/A | N/A |
| Modulus, MPa | 2953 | N/A | N/A | N/A | N/A |
| Yield strain, % | 4.5 | N/A | N/A | N/A | N/A |
| Break strain, % | 9.7 | N/A | N/A | N/A | N/A |

*Cure on 100 gram mass in 70° C. water bath.

Figure 5:
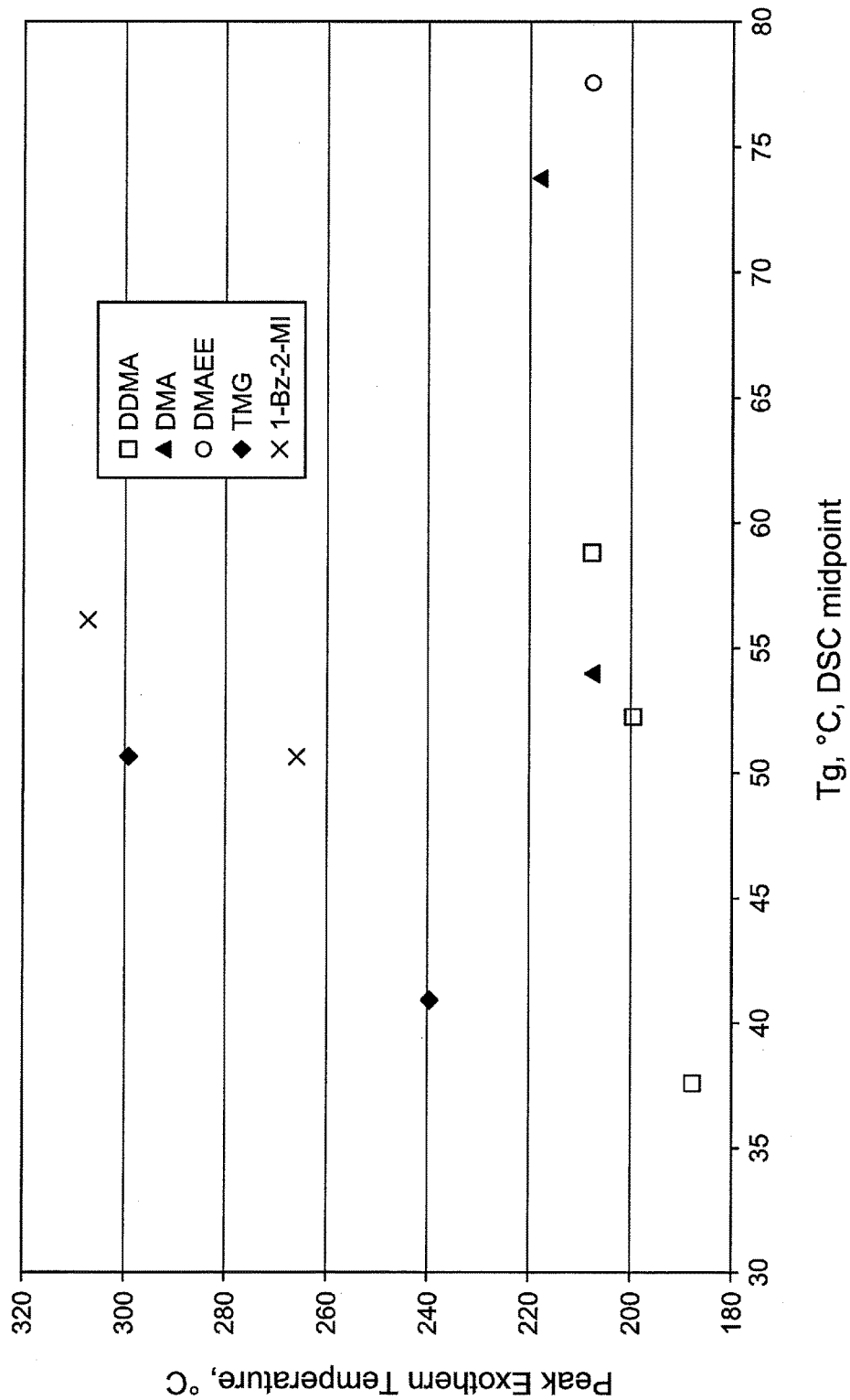
FIG. 5 is a plot illustrating one embodiment of a peak exothermic temperature versus glass transition temperature (Tg) for a series of compounds disclosed herein.
Figure 6:
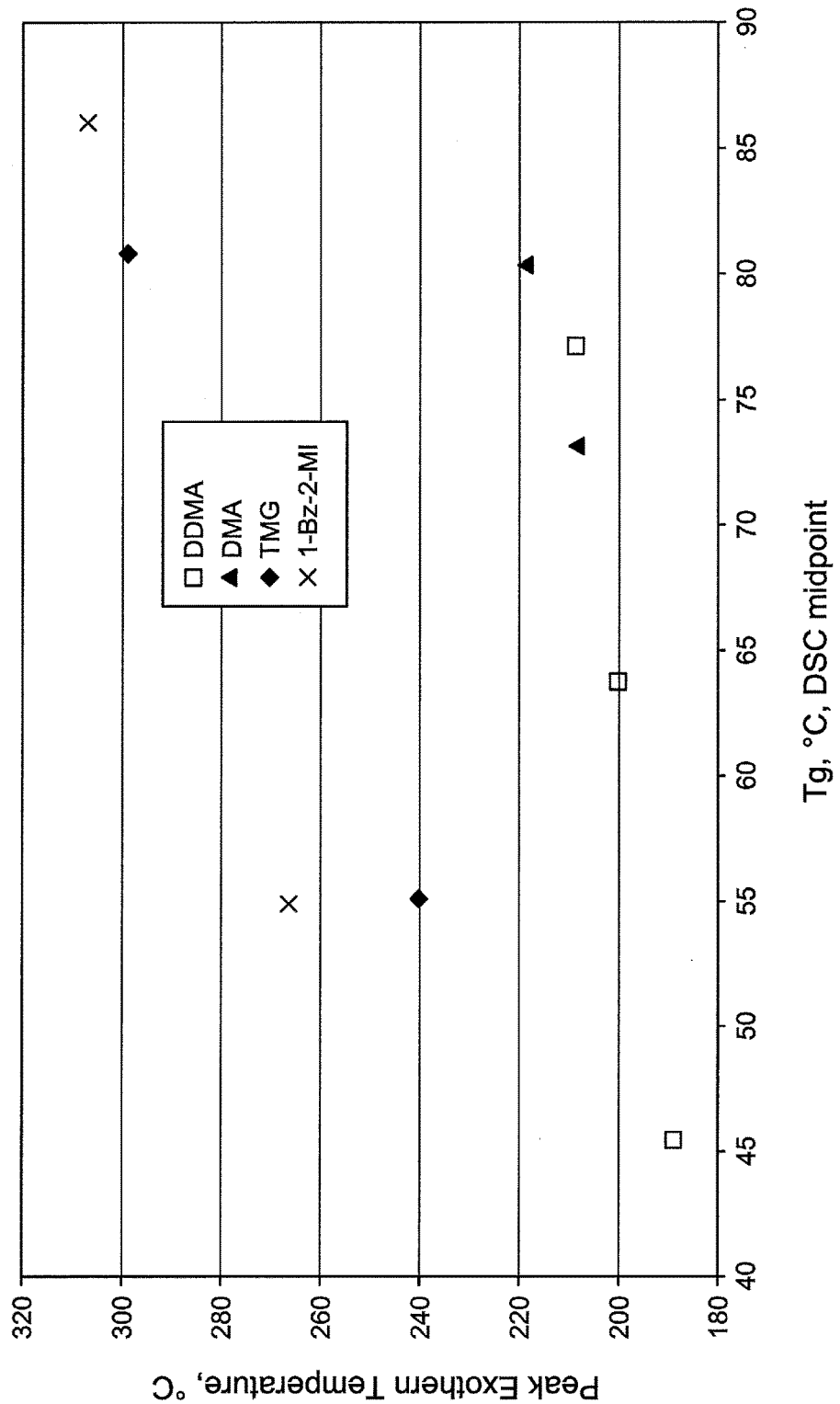
FIG. 6 is a plot illustrating another embodiment of a peak exothermic temperature versus glass transition temperature (Tg) for a series of compounds disclosed herein.

FIGS. 5 and 6 are plots of data from Tables 3A and 3B for maximum peak exotherm temperature (in degrees Celsius for 100 grams mass and 70° C. ambient) versus $T_g$ (glass transition temperature at the DSC midpoint) after 2 hours (FIG. 5) or 3 hours (FIG. 6) of cure at 70° C. From these figures one can see the superiority of the systems cured with the tertiary amines of DDMA (samples 2-4), DMA (samples 5-7) and DMAEE (sample 8) to those cured with TMG (samples 9-10) and 1-benzyl-2-methylimidazole (samples 11-12), in terms of lower maximum peak exotherm temperature at comparable values of $T_g$ after 2 or 3 hours cure at 70° C. Development of a certain value of $T_g$, generally 70° C. or 75° C. (or higher), is important in order for a molded item such as a wind turbine blade part to be able to be removed from the mold. The earlier the time at which such a $T_g$ is achieved, the shorter the production cycle time can be for that part. Hence it is important to have rapid development of $T_g$ in the mold while still having a value of maximum peak exotherm temperature low enough to minimize the likelihood of thermal degradation and cured property loss in thick sections.

Example 4: Effect of an Aliphatic Tertiary Amine on Uncured Viscosity and Cured $T_g$ of Resin Systems Cured with Primary Amines at Stoichiometric or Near-Stoichiometric Ratios of N—H to Epoxy Group A blend containing 100 parts of a composition of 81.5% EPON Resin 826 and 18.5% by weight of 1,4-butanediol diglycidyl ether (BDDGE) was hand-mixed in small polypropylene beakers with curing agent blends as shown in Table 4. Various crystallization-resistant blends of EPON Resin 828, EPON Resin 827 and EPON Resin 862 (an epoxy resin based on the bisphenol of formaldehyde, BPF) with BDDGE were similarly hand-mixed with curing agent blends as shown in Table 5.

The samples were placed into DSC pans as in Example 1 above and were cured at 70° C. for different amounts of time. The results are shown in Tables 4 and 5 below.

A separate experiment was conducted to simulate the temperatures which can develop in curing of thick sections of the resin mixtures due to heat buildup from the cure exotherm. Some of the formulations in Table 4 below were prepared at a 100-gram mass in a polypropylene beaker. The tip of a thermocouple was placed into the beaker and positioned at the center of the liquid resin mixture. The beaker was placed into a 70° C. water bath and the temperature at the center of the resin mass was monitored as a function of time. The respective maximum temperature reached and the times to reach such temperatures for the samples are shown in Table 4.

TABLE 4

Effect of dodecyldimethylamine (DDMA) on uncured viscosity and cured $T_g$ of resin systems cured with primary amines at a near stoichiometric ratio of N—H to epoxy group

| | Mixture# | | | | | | |
|---|---|---|---|---|---|---|---|
| | 1 (control) | 2 | 3 | 4 | 5 | 6 | 7 |
| 81.5% EPON Resin 826/18.5% BDDGE (diluent) mixture, parts | 100 | 100 | 100 | 100 | 100 | 100 | 100 |
| Curing agent formulation: | | | | | | | |
| Jeffamine D-230, parts | 20.48 | 20.48 | 20.48 | 19.44 | 19.44 | 18.46 | 18.46 |
| IPDA, parts | 10.92 | 10.92 | 10.92 | 10.47 | 10.47 | 9.94 | 9.94 |
| DDMA, parts | 0 | 1.00 | 2.00 | 1.00 | 2.00 | 2.00 | 3.00 |
| N—H/epoxy ratio | 0.991 | 0.991 | 0.991 | 0.95 | 0.95 | 0.902 | 0.902 |
| Viscosity, Brookfield, 25° C., mPa-s (cp) | 198.7 | 183.5 | 174.7 | 191.0 | 177.7 | 185.0 | 174.2 |

TABLE 4-continued

Effect of dodecyldimethylamine (DDMA) on uncured viscosity and cured $T_g$ of resin systems cured with primary amines at a near stoichiometric ratio of N—H to epoxy group

| | Mixture# | | | | | | |
|---|---|---|---|---|---|---|---|
| | 1 (control) | 2 | 3 | 4 | 5 | 6 | 7 |
| Time to 1 Pa-s viscosity at 30° C., min. | 162.5 | 136 | N/A | N/A | 148.5 | 151.5 | N/A |
| $T_g$, ° C., after 6 hours at 70° C.: | 73.6 | 77.2 | 77.6 | 76.8 | 77.9 | 79.0 | 77.8 |
| $T_g$, ° C., after 6 hours at 70° C. and 30 min at 180° C.: | 87.0 | 86.6 | 80.8 | 88.3 | 83.1 | 85.7 | 80.6 |
| Max peak exotherm temp at center, ° C.* | 272 | 269 | N/A | N/A | 266 | 264 | N/A |
| Time to max peak temperature, min.* | 13 | 13 | N/A | N/A | 14 | 13 | N/A |

*Cure on 100 gram mass in 70° C. water bath.

TABLE 5

Effect of dodecyldimethylamine (DDMA) on uncured viscosity and cured $T_g$ of BPA/BPF resin systems cured with primary amines at a near/stoichiometric ratio of N—H to epoxy group

| | Mixture# | | | | | | | | |
|---|---|---|---|---|---|---|---|---|---|
| | 1 control | 2 | 3 | 4 | 5 | 6 | 7 | 8 | 9 |
| Resin formulation: | | | | | | | | | |
| EPON Resin 828, parts | 48.9 | 48.9 | 48.9 | 0 | 0 | 0 | 0 | 0 | 0 |
| EPON Resin 827, parts | 0 | 0 | 0 | 65.2 | 65.2 | 65.2 | 54.6 | 54.6 | 54.6 |
| EPON Resin 862, parts | 32.6 | 32.6 | 32.6 | 16.3 | 16.3 | 16.3 | 26.9 | 26.9 | 26.9 |
| BDDGE, parts | 18.5 | 18.5 | 18.5 | 18.5 | 18.5 | 18.5 | 18.5 | 18.5 | 18.5 |
| Curing agent formulation: | | | | | | | | | |
| Jeffamine D-230, parts | 20.41 | 20.41 | 18.39 | 20.54 | 20.54 | 18.46 | 20.67 | 20.67 | 18.59 |
| IPDA, parts | 10.99 | 10.99 | 9.91 | 11.06 | 11.06 | 9.94 | 11.13 | 11.13 | 10.01 |
| DDMA, parts | 0 | 1.00 | 2.00 | 0 | 1.00 | 2.00 | 0 | 1.00 | 2.00 |
| NH/epoxy ratio | 0.999 | 0.999 | 0.901 | 1.001 | 1.000 | 0.899 | 0.999 | 0.999 | 0.899 |
| Viscosity, Brookfield, 25° C., mPa-s (cp) | 208.5 | 193.8 | 200.7 | 198.9 | 185.1 | 193.5 | 190.5 | 179.1 | 186.0 |
| $T_g$, ° C., after 6 hours at 70° C.: | 68.37 | 70.58 | 74.58 | 71.6 | 73.3 | 76.31 | 65.44 | 72.5 | 75.05 |
| $T_g$, ° C., after 6 hours at 70° C. and 30 min at 180° C.: | 79.72 | 81.57 | 81.39 | 80.49 | 81.7 | 83.07 | 80.47 | 81.09 | 81.98 |

Figure 7:
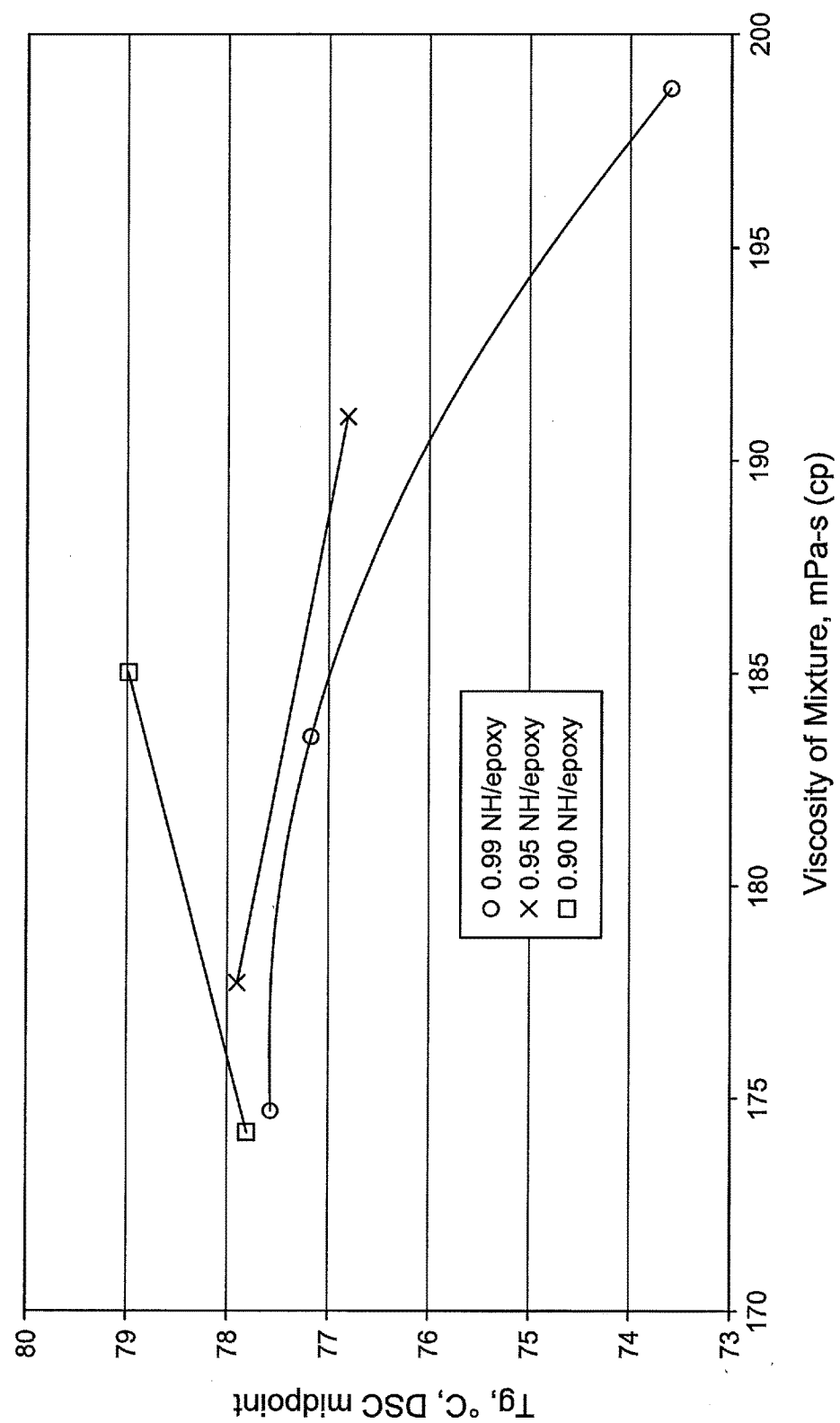
FIG. 7 is a plot illustrating another embodiment of glass transition temperatures ($T_g$) versus viscosity for various molar ratios of —NH bonds versus epoxy equivalents.

From Tables 4 and 5 one can see that addition of small amounts of DDMA to primary amine-cured epoxy systems with a stoichiometric or near-stoichiometric N—H/epoxy ratio can (desirably) yield both a decrease in mixed system viscosity and an increase in $T_g$ (after a standard 6-hour cure cycle at 70° C.). This holds for both the resin system in Table 4 and all three types of resin systems in Table 5. FIG. 7 is a plot of $T_g$ (glass transition temperature at the DSC midpoint after a standard 6-hour cure cycle at 70° C.) versus mixed viscosity (Initial 25° C. Brookfield viscosity of mixture in mPa-s(cp)) for the systems in Table 4. The three lines/curves in FIG. 7 connect points for systems with three different N—H/epoxy ratios (0.991, 0.95 and 0.902). Along each line or curve (constant N—H/epoxy ratio), the farther a point is to the left (lower viscosity), the higher the amount of DDMA it contains (reflecting the diluent effect of the DDMA). Here one can graphically see the increase in $T_g$ (up to a point) and decrease in viscosity as DDMA is added to the systems at different N—H/epoxy ratios.

In one embodiment of the curing agent, the curing agent includes 27.25 wt % of IPDA, 27.25 wt % of ADMA-12, and 45.5 of Jeffamine™ D-230. The curing agent mixture may be added to an epoxy resin mixture of 58 wt % of a BPA epoxy with a WPE (weight per epoxide) from about 179 to about 184, 20 wt % of a BPF epoxy with a WPE from 165 to 173, and 22 wt % of 1,4 butanediol digycidyl ether (BDDGE). The curing agent is added to the epoxy resin mixture at 23.5 parts of curing agent mixture per 100 parts of epoxy resin mixture.

The epoxy resin systems described herein may be used for the manufacturing of coating compositions such as ambient temperature cure coating compositions as well as heat cured coating compositions. The epoxy resin systems may be used and/or formed in one-part or two-part (2K) coating formulations.

Additionally, the epoxy resin systems described herein may be used for the manufacturing of composites. Composites may be formed by applying a curable epoxy resin composition to a substrate or a reinforcing material, such as by impregnating, infusing, molding, or coating the substrate or reinforcing material, and curing the curable composition. Curing of the curable compositions disclosed herein may require a temperature of up to about 250° C., such as at a temperature from about 30° C. to about 120° C., for example, about 70° C., for periods of minutes up to hours, depending on the epoxy resin system components. The above described epoxy resin systems may be in the form of a powder, slurry, or a liquid. After a curable epoxy resin system has been produced, as described above, it may be disposed on, in, or between the described substrates, before or during cure of the curable composition.

In one embodiment, a composite may be made by a process of providing a reinforcing fiber substrate, mixing an epoxy resin system from a composition comprising an epoxy resin component and a curing agent component as described herein, contacting the reinforcing fiber substrate with the epoxy resin system, and curing the epoxy resin system to form the composite. Contacting the reinforcing fiber substrate with the epoxy resin system may involve any typical composite fabrication process including hand lamination, an infusion process, filament winding, pultrusion, resin transfer molding, fiber pre-impregnation processes, compression molding, and combinations thereof.

The reinforcing fiber substrate may fibers and or fabrics of organic materials, such as polymeric materials, inorganic materials, such as glass, ceramics, metal-containing fibers, or combinations thereof, and combinations of organic or inorganic materials. The fibers may include carbon/graphite, boron, quartz, aluminum oxide; glass, such as E-glass (electrical glass), S glass, S-2 GLASS® material, C glass, or basalt glass; silicon carbide or silicon carbide fibers containing titanium, and combinations thereof. The fibers may have a random orientation, or be uni-directional fibers or +/−45° direction fibers, such as uni-directional fibers or +/−45° direction E-glass fibers. Examples of commercially available fibers may include organic fibers, such as KEVLAR™, aluminum oxide-containing fibers, such as NEXTEL™ fibers from 3M, silicon carbide fibers, such as NICALON™ from Nippon Carbon, and silicon carbide fibers containing titanium, such as TYRANNO™ from Ube.

The fabrics may be made of woven or non-woven fibers as described herein. The fabrics may be composed of fibers have multiple directions including 0°/90°, +/−45° direction fibers, random orientations, or other orientations. The fabrics may be of two or more layers of fibers.

The substrate may be a monolayer or a multi-layer material structure. For example, the substrate may be a composite of two alloys, a multi-layered polymeric article, and a metal-coated polymer, among others, for example. In other various embodiments, one or more layers of the curable composition may be disposed on a substrate.

The epoxy resin systems described herein may be used for fiber reinforced substrates described herein. In one embodiment, the fiber reinforced substrates comprise high strength filaments or fibers of carbon (graphite), glass, boron, and the like. Composites may contain up to about 75%, such as from about 45% to about 60%, of these fibers based on the total volume (vol %) of the composite. For example, the fibers of the composite may comprise about 70 vol % continuous uni-directional E-glass fibers or comprise up to about 75 vol % continuous +/−45° direction E-glass fibers.

Fiber reinforced composites, for example, may be formed by hot melt prepregging. The prepregging method involves impregnating bands or fabrics of continuous fiber with an epoxy resin system as described herein in liquid form to yield a prepreg, which is laid up and cured or partially cured to provide a composite.

Composites may be in various forms, such as circuit boards and the like for the electronics industry, automotive industry, aerospace industry, wind turbine blades, and sports equipment including skis, ski poles, and fishing rods, among others.

Composite examples and properties are shown as follows. The composites for the following examples were formed by the following process.

In one embodiment of the process, a composite forming device, an infusion assembly, was assembled as follows. A rigid mold was provided and a rectangular fiberglass fabric "stack" with specified fiber orientation and one or more fabric layers (plys) were disposed on the mold. A resin flow medium was provided along one end of the fiberglass stack used as a manifold to bring resin into the fiberglass stack and a vacuum flow medium was provided along one end of the fiberglass stack (opposite to the resin end) to provide even vacuum flow from the fiberglass stack to the vacuum source. A rigid metal plate was placed on top of the fiberglass stack to provide a flat top surface and the components were then covered in a flexible plastic container ("bag") to provide a vacuum tight seal between the mold surface and all the above components. A flexible heating blanket with a temperature controlling unit to provide even heating and accurate temperature control during the curing portion of the heating cycle was placed on top of the mold and bag. A resin tube with a vacuum tight connection to the resin flow medium and a vacuum tube with a vacuum tight connection to the vacuum flow medium were connected to the flexible plastic container, and a vacuum pump capable of providing absolute pressures typically less than 35 millibars was coupled to the vacuum tubing.

The process was then performed by turning on the vacuum to the infusion assembly with resin tube closed, measuring and thoroughly mixing the resin and curing agent components as described herein, placing the mixed resin into an infusion container and securing the resin tube to the infusion container. Opening of the infusion tube allows resin to flow into the mold until the resin has completely filled the fiberglass fabric. I-Teat was applied by turning on the heating blanket and heating to the desired cure temperature and the infusion process was continued by maintaining the cure temperature for a specified curing time.

The fiberglass fabrics used for the reported test results were "non-crimped" stitched fabrics which are typically used to make large wind turbine blades. Uni-directional (nominal 970 gram/sq meter) and ±45° (nominal 818 g/sq meter) fabrics were used.

Additionally, the properties were tested using the tests as follows:

The tensile strength, tensile modulus, and the tensile elongation of the cured resins in the Examples were measured by the ISO 527-5 procedure. The tensile first break strength was determined as the maximum value in the stress-strain curve at the strain value where the first significant drop of the stress/lead value is observed. The 0° Flex Strength and 0° Flex Modulus were measured by the ASTM D790 procedure. The in-Plane Shear Strength was measured by ISO 14129.

Table 6 below illustrates a comparison between the DDMA made composites verses the Control 1 composites at different cure times.

TABLE 6

| | Property Test | | | |
|---|---|---|---|---|
| | Control Panel 1 | Control Panel 2 | DDMA based Panel 1 | DDMA based Panel 1 |
| Resin System | Resin Mixture R Curing Agent C | Resin Mixture R Curing Agent C | Resin Mixture R Curing Agent C DDMA | Resin Mixture R Curing Agent C DDMA |
| Mix Ratio (parts by wt) | 100:30 | 100:30 | 100:15:6 | 100:15:6 |
| Cure conditions | 75° C. at 5 hours | 75° C. at 8.3 hours | 72° C. and 75° C. each at 3 hours | 75° C. at 7.5 hours |
| Transverse Tensile Strength (TTS) MPa-1$^{st}$ break | 29.9 | 25.5 | 51.1 | 53.7 |
| TTS Strain-1$^{st}$ break, % | 0.25 | 0.25 | 0.56 | 0.51 |
| 0° Flex Strength MPa | 813 | 852 | 1015 | 998 |
| 0° Flex Modulus GPa | 32.7 | 33.7 | 33.9 | 35 |
| In-Plane Shear Strength (+−45 tensile), MPa | 54.7 | N/A | 62 | N/A |

1. Resin Mixture R contains 80% by weight EPON™ Resin 828 and 20% by weight of 1,6 hexanediol diglycidyl ether (HDDGE).
2. Curing Agent mixture C contains 60% by weight Jeffamine™ D-230 and 40% by weight of isophoronediamine (IPDA).

As illustrated in Table 6, the panels made with the tertiary and primary/secondary amine curing agents of the present invention showed unexpectedly and surprisingly improved Transverse Tensile Strength and Transverse Tensile Strain properties with improved 0° Flex Strength and In-Plane Shear Strength.

Additionally, multiple panels of the control panel and the DDMA panel in Table 6 were produced and tested to determine the consistency of the data, and the surprising results were consistently found. For example, Transverse Tensile Strength was measured to have a range from 49 to 57.5 MPa as compared to the control panel range of 24.4 to 46.3 MPa. Transverse Tensile Strain properties for the DDMA based panels were found to be 0.39 to 0.62 as compared to 0.23 to 0.27 of the control panels. 0° Flex Strength properties for the DDMA based panels were found to be 970 to 1051 MPa as compared to 729 to 952 MPa of the control panels. In-Plane Shear Strength properties for the DDMA based panels were found to be 60.9 to 63.1 MPa as compared to the 51.6 to 57.1 MPa of the control panels.

While the present invention has been described and illustrated by reference to particular embodiments, those of ordinary skill in the art will appreciate that the invention lends itself to variations not necessarily illustrated herein.

What is claimed is:

1. A method for preparing an epoxy resin product, comprising:
   providing an epoxy resin component to a mixing device;
   providing a curing agent component to the mixing device, and the curing agent component comprising:
   a first amine compound represented by the formula:

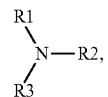

wherein R1 and R2 each comprise an organic functional group having from 1-6 carbon atoms, and R3 comprises an aralkyl group; and
   a second amine compound having one or more primary amine groups, one or more secondary amine groups, or combinations thereof, wherein the stoichiometric ratio of the —NH bonds of the second amine compound to the epoxy groups of the epoxy resin component is from 3:10 to 19:20 and the molar ratio of the second amine compound to the first amine compound is from about 0.01:1 to about 100:1; and
   reacting the epoxy resin component and curing agent.

2. The method of claim 1, wherein the reaction of the epoxy resin component and the curing agent exhibits a maximum exothermic temperature of 230° C. or lower for a 100 gram mass in a water bath at 70° C.

3. The method of claim 1, wherein the second amine compound comprises one or more amine compounds selected from the group consisting of a polyether diamine, a saturated aliphatic ring diamine, and combinations thereof.

4. The method of claim 1, wherein the R3 further comprises a functional group selected from the group consisting of a primary amine group, a secondary amine group, a tertiary amine group, and combinations thereof.

5. The method of claim 1, wherein R1 and R2 each comprise a functional group selected from the group consisting of a methyl group, an ethyl group, a propyl group, a C5-C6 carbocyclic aliphatic ring, a C5-C6 heterocyclic aliphatic ring, a C5-C6 saturated aliphatic ring, a C5-C6 unsaturated aliphatic ring, and combinations thereof.

6. The method of claim 1, wherein the R3 group comprises a benzyl group.

7. The method of claim 1, wherein the polyether diamine has the formula: $H_2NCH(CH_3)CH_2[OCH_2CH(CH_3)]_xNH_2$, and x is from 2 to 70.

8. The method of claim 1, wherein the epoxy resin component further comprises:
   a polyglycidyl ether of a compound selected from the group consisting of an aliphatic glycol, a cycloaliphatic glycol, a triol, a polyol, a polyglycol, and combinations thereof,
   a polyacrylate or polymethacrylate ester of a polyol, or a combination thereof.

9. The method of claim 1, wherein the composition of the epoxy resin component and the curing agent exhibits a $T_g$ of 75° C. at a cure time of less than 3 hours as measured by Differential Scanning Calorimetry.

10. The method of claim 1, further comprising
    providing a reinforcing fiber substrate; and
    contacting the reinforcing fiber substrate with the epoxy resin system.

11. The method of claim 10, wherein the reinforced fiber substrate comprises one or more layers of fiberglass material.

12. The method of claim 10, wherein the contacting the reinforcing fiber substrate with the epoxy resin system comprises an application process selected from the group consisting of an infusion process, a molding process, a layering process, and combinations thereof.

13. A composition comprising an epoxy resin system, the epoxy resin system comprising a reaction product of:
an epoxy resin component; and
a curing agent component comprising:
a first amine compound represented by the formula:

wherein R1 and R2 each comprise an organic functional group having from 1-6 carbon atoms, and R3 comprises an aralkyl group;
a second amine compound having one or more primary amine groups, one or more secondary amine groups, or combinations thereof, wherein the stoichiometric ratio of the —NH bonds of the second amine compound to the epoxy groups of the epoxy resin component is from about 1:20 to about 19:20 and the molar ratio of the second amine compound to the first amine compound is from about 0.01:1 to about 100:1.

14. The composition of claim 13, wherein the second amine compound comprises one or more amine compounds selected from the group consisting of a polyether diamine, a saturated aliphatic ring diamine, a linear aliphatic amine, and combinations thereof.

15. The composition of claim 13, wherein the R3 group further comprises a functional group selected from the group consisting of a primary amine group, a secondary amine group, a tertiary amine group, and combinations thereof.

16. The composition of claim 13, wherein R1 and R2 each comprise a functional group selected from the group consisting of a methyl group, an ethyl group, a propyl group, a C5-C6 carbocyclic aliphatic ring, a C5-C6 heterocyclic aliphatic ring, a C5-C6 saturated aliphatic ring, a C5-C6 unsaturated aliphatic ring, and combinations thereof.

17. The composition of claim 13, wherein the R3 group comprises a benzyl group.

18. The composition of claim 14, wherein the polyether diamine has the formula: $H_2NCH(CH_3)CH_2[OCH_2CH(CH_3)]_xNH_2$, and x is from 2 to 70.

19. The composition of claim 13, wherein the epoxy resin component further comprises:
a polyglycidyl ether of a compound selected from the group consisting of an aliphatic glycol, a cycloaliphatic glycol, a triol, a polyol, a polyglycol, and combinations thereof,
a polyacrylate or polymethacrylate ester of a polyol, or a combination thereof.

20. The composition of claim 13, wherein, when cured, the reaction product of the epoxy resin component and the curing agent exhibits a $T_g$ of 75° C. or higher at a cure time of three hours or less as measured by Differential Scanning Calorimetry.

21. The composition of claim 13, wherein, when curing, the reaction product of the epoxy resin component and the curing agent exhibits a maximum exothermic temperature of 230° C. or lower for a 100 gram mass in a water bath at 70° C.

22. The composition of claim 13, wherein the curing agent further comprises a modified amine compound selected from the group consisting of a secondary amine, a Mannich base, an amine-epoxy adduct, and combinations thereof.

23. The composition of claim 13, wherein R1 and R2 are both methyl functional groups.

24. The composition of claim 13, wherein the composition further comprises a mineral material selected from the group consisting of clay, boehmite, calcium carbonates, aluminosilicates, silica, and combinations thereof.

* * * * *